United States Patent
Chen

(10) Patent No.: US 9,557,530 B2
(45) Date of Patent: Jan. 31, 2017

(54) PHOTOGRAPHING OPTICAL LENS ASSEMBLY, IMAGE CAPTURING UNIT AND MOBILE DEVICE

(71) Applicant: LARGAN Precision Co., Ltd., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 297 days.

(21) Appl. No.: 14/324,713

(22) Filed: Jul. 7, 2014

(65) Prior Publication Data
US 2015/0316749 A1    Nov. 5, 2015

(30) Foreign Application Priority Data
May 2, 2014 (TW) .............................. 103115851 A

(51) Int. Cl.
G02B 9/62 (2006.01)
G02B 13/00 (2006.01)
H04N 5/372 (2011.01)
H04N 5/374 (2011.01)
H04N 5/225 (2006.01)

(52) U.S. Cl.
CPC ........ *G02B 13/0045* (2013.01); *H04N 5/2253* (2013.01); *H04N 5/2254* (2013.01); *H04N 5/372* (2013.01); *H04N 5/374* (2013.01)

(58) Field of Classification Search
CPC ..... G02B 13/0045; G02B 9/62; H04N 5/2254; H04N 5/2253
See application file for complete search history.

(56) References Cited

U.S. PATENT DOCUMENTS

| | | |
|---|---|---|
| 8,335,043 B2 | 12/2012 | Huang |
| 8,385,006 B2 | 2/2013 | Tsai et al. |
| 2014/0078603 A1 | 3/2014 | You |

(Continued)

FOREIGN PATENT DOCUMENTS

| | | | |
|---|---|---|---|
| JP | 2011085733 A | 4/2011 | |
| TW | 201344237 A | 11/2013 | |

(Continued)

OTHER PUBLICATIONS

Office Action From TIPO Dated Jan. 13, 2015.

*Primary Examiner* — Joseph P Martinez
(74) *Attorney, Agent, or Firm* — Maschoff Brennan

(57) ABSTRACT

A photographing optical lens assembly includes, in order from the object side to the image side, a first lens element, a second lens element, a third lens element, a fourth lens element, a fifth lens element and a sixth lens element. The first lens element, the second lens element and the fourth lens element have positive refractive power. The third lens element has refractive power. The fifth lens element has negative refractive power. The sixth lens element with refractive power has an image-side surface being concave in a paraxial region thereof and having at least one convex shape in an off-axis region thereof. An object-side surface and an image-side surface of the sixth lens element both are aspheric. Both of an absolute value of a focal length of the fourth lens element and that of the fifth lens element each are greater than those of the other lens elements.

26 Claims, 18 Drawing Sheets

(56) References Cited

U.S. PATENT DOCUMENTS

2015/0029599 A1\* 1/2015 Huang .................... G02B 3/04
359/713

FOREIGN PATENT DOCUMENTS

| TW | 201411182 A | 3/2014 |
|----|-------------|--------|
| TW | 201447356 A | 12/2014 |
| TW | 201447357 A | 12/2014 |
| WO | 2014162779 A1 | 10/2014 |

\* cited by examiner

PHOTOGRAPHING OPTICAL LENS ASSEMBLY, IMAGE CAPTURING UNIT AND MOBILE DEVICE

RELATED APPLICATIONS

This application claims priority to Taiwan Application Serial Number 103115851, filed May 2, 2014, which is incorporated by reference herein in its entirety.

BACKGROUND

Technical Field

The present disclosure relates to a photographing optical lens assembly, an image capturing unit and a mobile device, more particularly to a photographing optical lens assembly and an image capturing unit applicable to a mobile device.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a five-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with six-element lens structure enhance image quality and resolution. However, in order to keep the optical system compact, the refractive power of the first lens element and the refractive power of the second lens element are enhanced. Therefore, it is unfavorable for correcting the aberration of the optical system, thereby leading to worse image quality.

SUMMARY

According to one aspect of the present disclosure, a photographing optical lens assembly includes, in order from an object side to an image side, a first lens element, a second lens element, a third lens element, a fourth lens element, a fifth lens element and a sixth lens element. The first lens element has positive refractive power. The second lens element has positive refractive power. The third lens element has refractive power. The fourth lens element has positive refractive power. The fifth lens element has negative refractive power. The sixth lens element with refractive power has an image-side surface being concave in a paraxial region thereof, wherein the image-side surface of the sixth lens element has at least one convex shape in an off-axis region thereof. Both of an object-side surface and the image-side surface of the sixth lens element are aspheric. The photographing optical lens assembly has a total of six lens elements with refractive power. Both of an absolute value of a focal length of the fourth lens element and an absolute value of a focal length of the fifth lens element are smaller than an absolute value of a focal length of the first lens element, an absolute value of a focal length of the second lens element, an absolute value of a focal length of the third lens element and an absolute value of a focal length of the sixth lens element. When the focal length of the first lens element is f1, the focal length of the second lens element is f2, the following condition is satisfied:

$$0.80 < f1/f2.$$

According to another aspect of the present disclosure, an image capturing unit includes the photographing optical lens assembly according to the aforementioned aspect and an image sensor, wherein the image sensor is located on the image side of the photographing optical lens assembly.

According to still another aspect of the present disclosure, a mobile device includes the image capturing unit according to the foregoing aspect.

According to the yet another aspect of the present disclosure, a photographing optical lens assembly includes, in order from an object side to an image side, a first lens element, a second lens element, a third lens element, a fourth lens element, a fifth lens element and a sixth lens element. The first lens element has positive refractive power. The second lens element with positive refractive power has an object-side surface being convex in a paraxial region thereof. The third lens element has refractive power. The fourth lens element has positive refractive power. The fifth lens element has negative refractive power. The sixth lens element with refractive power has an image-side surface being concave in a paraxial region thereof, wherein the image-side surface of the sixth lens element has at least one convex shape in an off-axis region thereof. Both of an object-side surface and the image-side surface of the sixth lens element are aspheric. The photographing optical lens assembly has a total of six lens elements with refractive power. Both of an absolute value of a focal length of the fourth lens element and an absolute value of a focal length of the fifth lens element are smaller than an absolute value of a focal length of the first lens element, an absolute value of a focal length of the second lens element, an absolute value of a focal length of the third lens element and an absolute value of a focal length of the sixth lens element.

According to still yet another aspect of the present disclosure, an image capturing unit includes the photographing optical lens assembly according to the aforementioned aspect and an image sensor, wherein the image sensor is located on the image side of the photographing optical lens assembly.

According to still yet another aspect of the present disclosure, a mobile device includes the image capturing unit according to the foregoing aspect.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
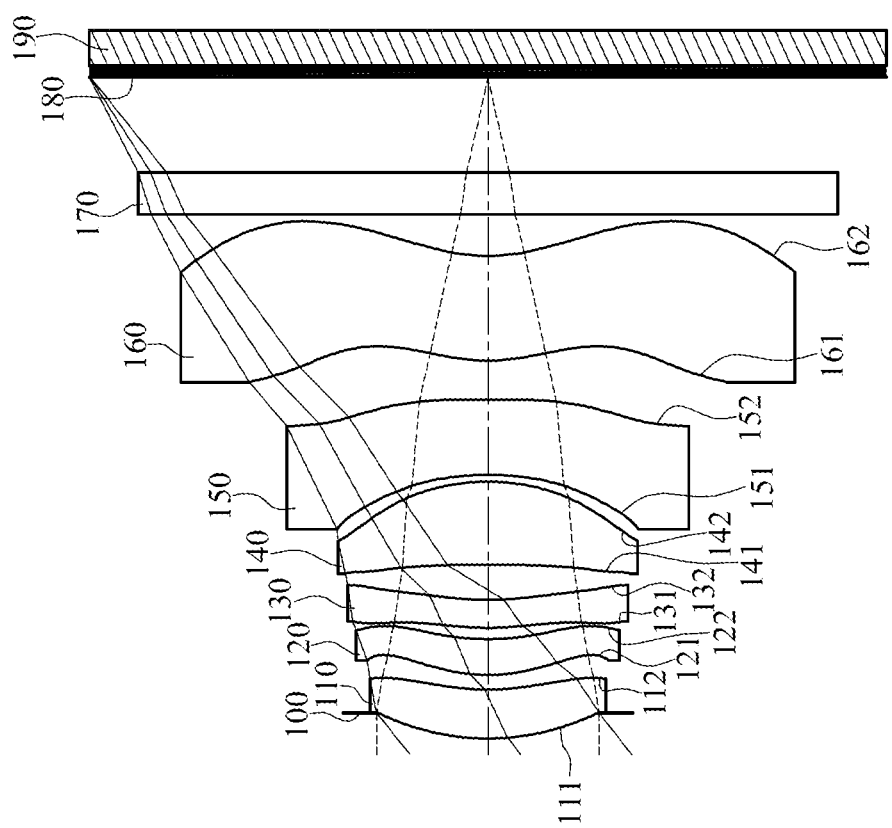
FIG. 1 is a schematic view of an image capturing unit according to the 1st embodiment of the present disclosure.

An photographing optical lens assembly includes, in order from an object side to an image side, a first lens element, a second lens element, a third lens element, a fourth lens element, a fifth lens element, and a sixth lens element. The photographing optical lens assembly has a total of six lens elements with refractive power.

There is an air gap in a paraxial region between any two of the first lens element, the second lens element, the third lens element, the fourth lens element, the fifth lens element and the sixth lens element that are adjacent to each other. An air gap is between two adjacent surfaces of any two adjacent lens elements, that is, each of the first through sixth lens elements of the photographing optical lens assembly is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the photographing optical lens assembly. Therefore, each of the six lens elements of the photographing optical lens assembly is separated from each other in the present disclosure for improving the problem generated by the cemented lens elements.

The first lens element has positive refractive power, so that it provides the photographing optical lens assembly with the positive refractive power as it needs to be to reduce the total track length thereof. At least one of an object-side surface and an image-side surface of the first lens element has at least one inflection point. Therefore, it is favorable for effectively reducing the incident angle of the light projecting onto an image sensor so as to improve the responding sensitivity of the image sensor for further correcting the aberration of the off-axis region thereof.

The second lens element has positive refractive power so that it is favorable for reducing the photosensitivity and the spherical aberration of the photographing optical lens assembly. The second lens element can have an object-side surface being convex in a paraxial region thereof, wherein the object-side surface of the second lens element has at least one concave shape in an off-axis region thereof. At least one of the object-side surface of the second lens element and an image-side surface of the second lens element has at least one inflection point. Therefore, it is favorable for effectively reducing the incident angle of the light projecting onto an image sensor, so that it is favorable for improving the responding sensitivity of the image sensor to further correct the aberration of the off-axis.

The third lens element with refractive power can have an image-side surface being concave in a paraxial region thereof. Therefore, it is favorable for correcting the astigmatism. At least one of an object-side surface and the image-side surface of the third lens element has at least one inflection point. Therefore, it is favorable for effectively reducing the incident angle of the light projecting onto an image sensor so as to improve the responding sensitivity of the image sensor for further correcting the aberration of the off-axis.

The fourth lens element can have positive refractive power. Therefore, it is favorable for reducing the photosensitivity of the photographing optical lens assembly by balancing with the positive refractive power of the first lens element.

The fifth lens element has negative refractive power. The fifth lens element can have an object-side surface being concave in a paraxial region thereof. Therefore, it is favorable for reducing total track length of the photographing optical lens assembly so as to keep the photographing optical lens assembly compact.

The sixth lens element with refractive power has an image-side surface being concave in a paraxial region thereof. The image-side surface of the sixth lens element has at least one convex shape in an off-axis region thereof. Therefore, it is favorable for effectively reducing the incident angle of the light projecting onto an image sensor so as to improve the responding sensitivity of the image sensor for further correcting the aberration of the off-axis.

Both of an absolute value of a focal length of the fourth lens element and an absolute value of a focal length of the fifth lens element are smaller than an absolute value of a focal length of the first lens element, an absolute value of a focal length of the second lens element, an absolute value of a focal length of the third lens element and an absolute value of a focal length of the sixth lens element, whereby the fourth lens element and the fifth lens element have stronger refractive power compared with the other lens elements. Therefore, it is favorable for correcting the aberration generated by the first lens element and the second lens element with excessively strong refractive power.

When the focal length of the first lens element is f1, the focal length of the second lens element is f2, the following condition is satisfied: $0.80<f1/f2$. Therefore, it is favorable for balancing the refractive powers. Preferably, the following condition is satisfied: $1.20<f1/f2<6.0$.

When a focal length of the photographing optical lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the following condition is satisfied: $f/f4>f/fi$ (i=1, 2, 3, 5 or 6). Therefore, the fourth lens element has stronger refractive power, so that it is favorable for reducing the back focal length of the photographing optical lens assembly, reducing the photosensitivity and aberration of the photographing optical lens assembly.

When a central thickness of the first lens element is CT1, a central thickness of the second lens element is CT2, the following condition is satisfied: $1.0<CT1/CT2<1.6$. Therefore, it is favorable for assembling the photographing optical lens assembly to improve assembling of the lens elements and manufacturing yield rate of the photographing optical lens assembly.

When a sum of central thicknesses of the first lens element through the sixth lens element is $\Sigma CT$, an axial distance between an object-side surface of the first lens element and the image-side surface of the sixth lens element is Td, the following condition is satisfied: $0.70<\Sigma CT/Td<0.95$. Therefore, the arrangement of the thickness of the lens elements is more proper, so that it is favorable for assembling and arranging the photographing optical lens assembly.

When the focal length of the photographing optical lens assembly is f, the focal length of the first lens element is f1, the focal length of the second lens element is f2, the focal length of the third lens element is f3, the following condition is satisfied: $|f/f1|+|f/f2|+|f/f3|<0.80$. Therefore, it is favorable for balancing the refractive powers among the first lens element, the second lens element and the third lens element so as to correct the aberration of the photographing optical lens assembly.

When an axial distance between the object-side surface of the second lens element and the image-side surface of the third lens element is Dr3r6, a central thickness of the fourth lens element is CT4, and the following condition is satisfied: $Dr3r6/CT4<1.0$. Therefore, it is favorable for arranging the photographing optical lens assembly to further enhance the image quality.

When the focal length of the photographing optical lens assembly is f, a curvature radius of the object-side surface of the first lens element is R1, a curvature radius of the image-side surface of the first lens element is R2, a curvature radius of the object-side surface of the second lens element is R3, a curvature radius of the image-side surface of the second lens element is R4, a curvature radius of the object-side surface of the third lens element is R5, a curvature radius of the image-side surface of the third lens element is R6, and the following condition is satisfied: $(|R1|+|R2|+|R3|+|R4|+|R5|+|R6|)/f<4.5$. Therefore, the curvature radii of the first lens element, the second lens element and the third lens element are proper to correct the aberration, the astigmatism and the spherical aberration.

Only the fifth lens element has an Abbe number being smaller than 30 among the first lens element through the sixth lens element. Therefore, it is favorable for correcting the chromatic aberration of the photographing optical lens assembly.

When a composite focal length of the first lens element, the second lens element and the third lens element is f123, the focal length of the fourth lens element is f4, the following condition is satisfied: $1.2<f123/f4<3.0$. Therefore, it is favorable for reducing the spherical aberration and the astigmatism by arranging the refractive powers properly.

When the focal length of the photographing optical lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the following condition is satisfied: $f/f5<f/fi$ (i=1, 2, 3, 4 or 6). Therefore, it is favorable for reducing the back focal length of the photographing optical lens assembly so as to reduce the photosensitivity and the aberration of the photographing optical lens assembly.

According to the photographing optical lens assembly of the present disclosure, the lens elements thereof can be made of glass or plastic material. When the lens elements are made of glass material, the distribution of the refractive power of the photographing optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing optical lens assembly can also be reduced.

According to the photographing optical lens assembly of the present disclosure, each of an object-side surface and an image-side surface has a paraxial region and an off-axis region. The paraxial region refers to the region of the surface where light rays travel close to the axial axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, an aperture stop can be configured as a front stop or a middle stop. A front stop disposed between an imaged object and the first lens element can provide a longer distance between an exit pupil of the photographing optical lens assembly and the image plane and thereby improves the image-sensing efficiency of an image sensor. A middle stop disposed between the first lens element and the image plane is favorable for enlarging the field of view of the photographing optical lens assembly and thereby provides a wider field of view for the same.

According to the present disclosure, an image capturing unit is provided. The image capturing unit includes the photographing optical lens assembly according to the aforementioned photographing optical lens assembly of the present disclosure, and the image sensor, wherein the image sensor is disposed on the image side of the aforementioned photographing optical lens assembly, that is, the image sensor can be disposed on or near the image plane of the aforementioned photographing optical lens assembly. In some embodiments, the image capturing unit can further include a barrel member, a holding member or a combination thereof.

Figure 18:
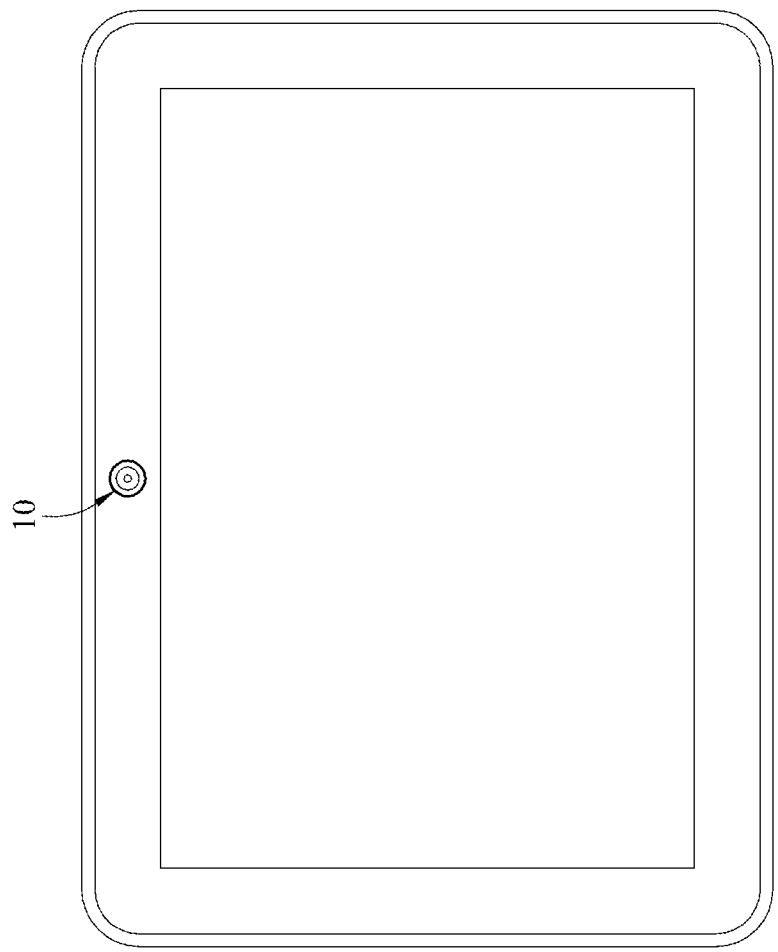
FIG. 18 shows a mobile device according to an embodiment.
Figure 17:
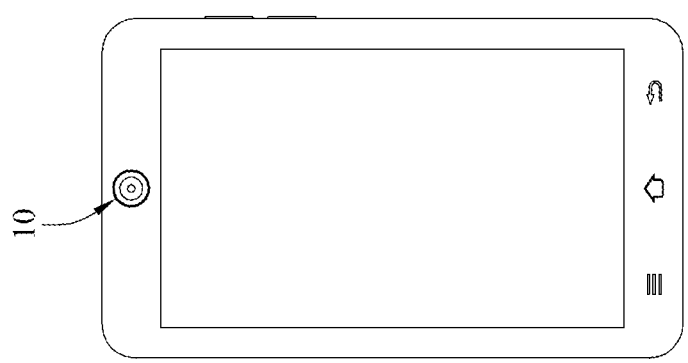
FIG. 17 shows a mobile device according to an embodiment.
Figure 19:
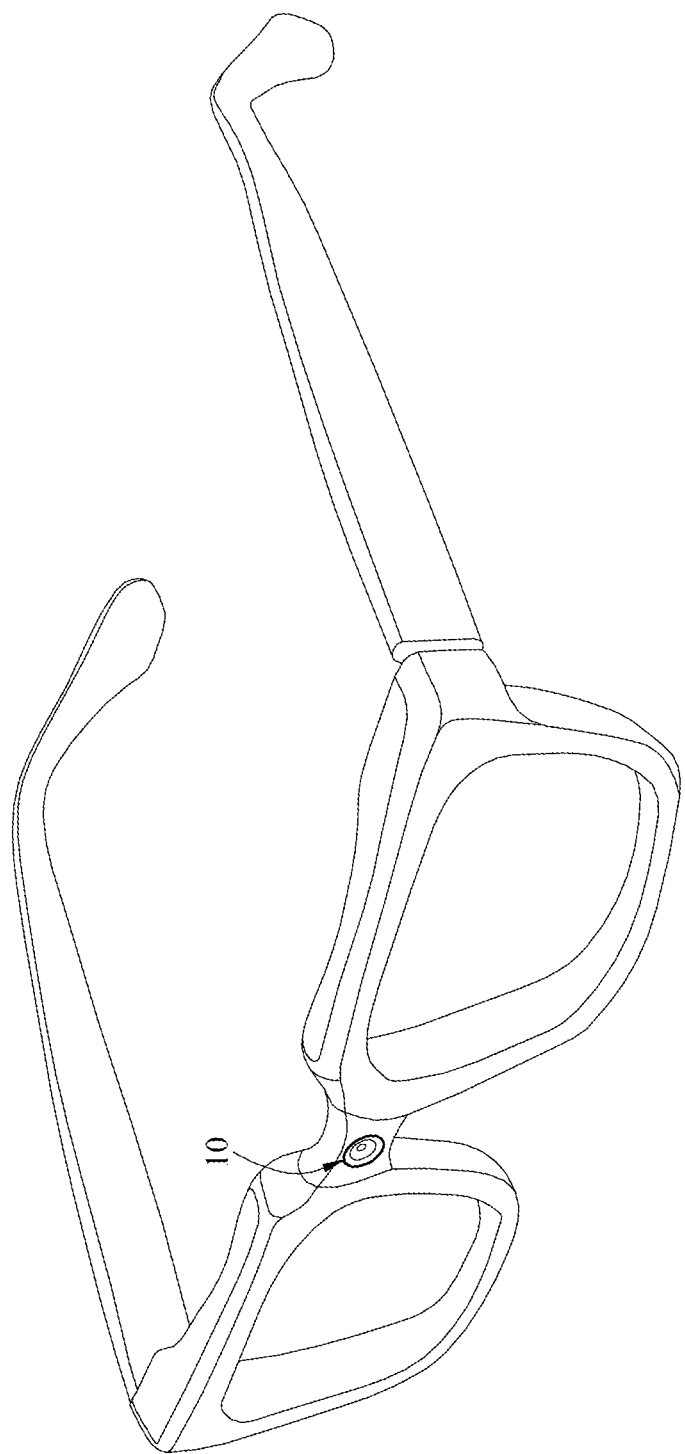
FIG. 19 shows a mobile device according to an embodiment.

In FIG. 17, FIG. 18 and FIG. 19, an image capturing device 10 may be installed in, but not limited to, a mobile terminal, including a smart phone (FIG. 17), a tablet personal computer (FIG. 18) or a wearable device (FIG. 19). The three exemplary figures of different kinds of mobile terminal are only exemplary for showing the image capturing device of present disclosure installing in a mobile terminal and is not limited thereto. In some embodiments, the mobile terminal can further include, but not limited to, a display, a control unit, a random access memory unit (RAM), a read only memory unit (ROM) or a combination thereof.

According to the photographing optical lens assembly of the present disclosure, the photographing optical lens assembly can be optionally applied to moving focus optical systems. Furthermore, the photographing optical lens assembly is featured with good correction ability and high image quality, and can be applied to 3D (three-dimensional) image capturing applications, in products such as digital cameras, mobile devices, digital tablets, wearable devices and other mobile terminals.

According to the above description of the present disclosure, the following specific embodiments are provided for further explanation.

1st Embodiment

Figure 2:
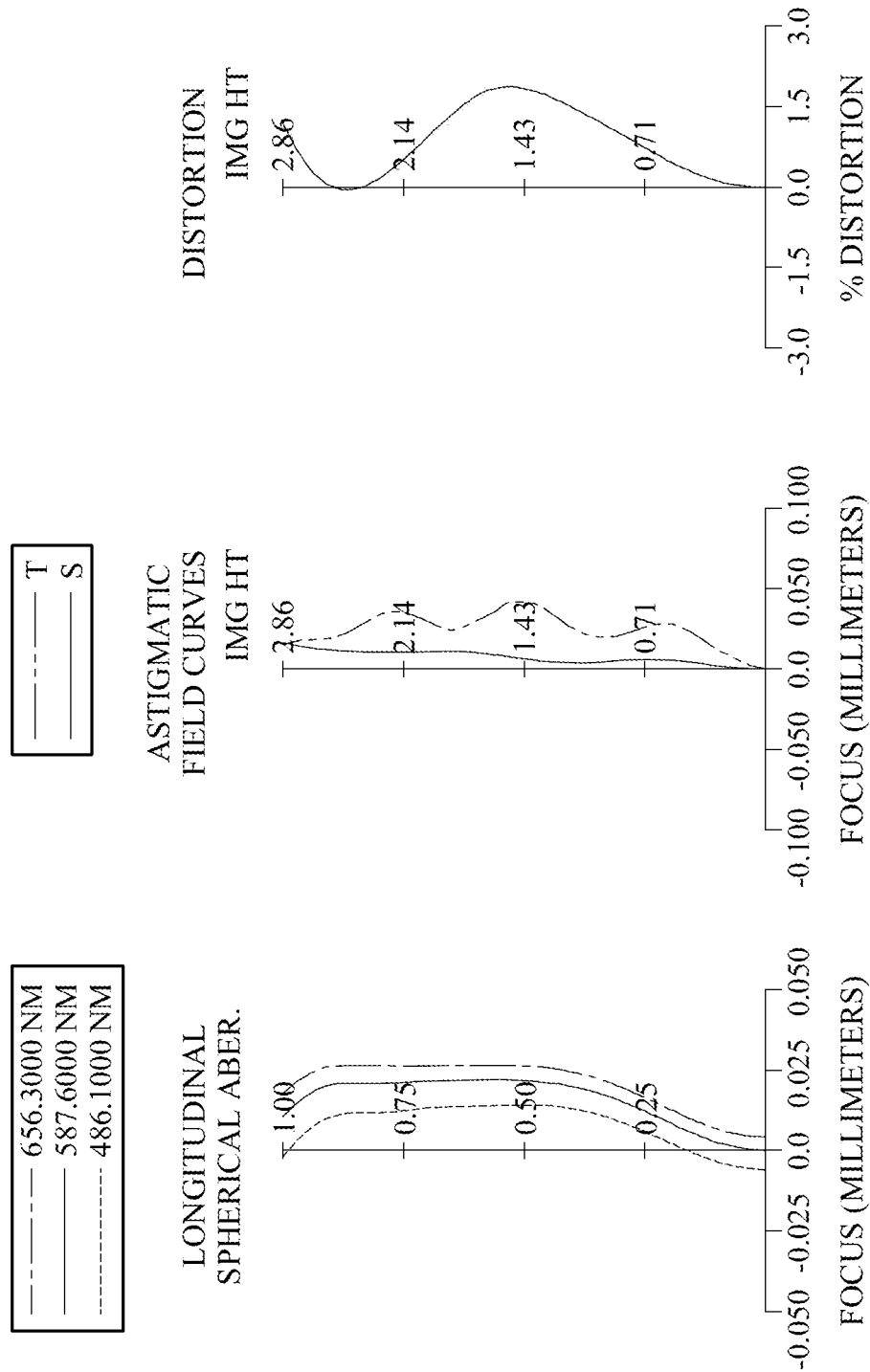
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 190. The photographing optical lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image plane 180, wherein the photographing optical lens assembly has a total of six lens elements (110-160) with refractive power. There is an air gap in a paraxial region between any two of the first lens element 110, the second lens element 120, the third lens element 130, the fourth lens element 140, the fifth lens element 150 and the sixth lens element 160 that are adjacent to each other.

The first lens element 110 with positive refractive power has an object-side surface 111 being convex in a paraxial region thereof and an image-side surface 112 being concave in a paraxial region thereof. The image-side surface 112 of the first lens element 110 has at least one inflection point. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being concave in a paraxial region thereof. The object-side surface 121 of the second lens element 120 has at least one concave shape in an off-axis region thereof. Both of the object-side surface 121 and the image-side surface 122 of the second lens element 120 have at least one inflection point. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. Both of the object-side surface 131 and the image-side surface 132 of the third lens element 130 have at least one inflection point. The third lens element 130 is made of plastic material and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being concave in a paraxial region thereof. The fifth lens element 150 is made of plastic material and has the object-side surface 151 and the image-side surface 152 being both aspheric.

The sixth lens element 160 with positive refractive power has an object-side surface 161 being convex in a paraxial region thereof and an image-side surface 162 being concave in a paraxial region thereof. The image-side surface 162 of the sixth lens element 160 has at least one convex shape in an off-axis region thereof. The sixth lens element 160 is made of plastic material and has the object-side surface 161 and the image-side surface 162 being both aspheric.

The IR-cut filter 170 is made of glass and located between the sixth lens element 160 and the image plane 180, and will not affect the focal length of the photographing optical lens assembly. The image sensor 190 is disposed on or near the image plane 180 of the photographing optical lens assembly.

The equation of the aspheric surface profiles of the aforementioned lens elements of the 1st embodiment is expressed as follows:

$$X(Y) = (Y^2/R)/\left(1 + sqrt(1 - (1+k)\times(Y/R)^2)\right) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing optical lens assembly of the image capturing unit according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=3.59 mm; Fno=2.25; and HFOV=38.1 degrees.

When a central thickness of the first lens element 110 is CT1, a central thickness of the second lens element 120 is CT2, the following condition is satisfied: CT1/CT2=1.37.

When an axial distance between the object-side surface 121 of the second lens element 120 and the image-side surface 132 of the third lens element 130 is Dr3r6, a central thickness of the fourth lens element 140 is CT4, and the following condition is satisfied: Dr3r6/CT4=0.91.

When a sum of central thicknesses of the first lens element 110 through the sixth lens element 160 is ΣCT, an axial distance between the object-side surface 111 of the first lens element 110 and the image-side surface 162 of the sixth lens element 160 is Td, the following condition is satisfied: ΣCT/Td=0.78.

When a focal length of the first lens element 110 is f1, a focal length of the second lens element 120 is f2, the following condition is satisfied: f1/f2=5.40.

When the focal length of the photographing optical lens assembly is f, the focal length of the first lens element 110 is f1, the focal length of the second lens element 120 is f2, a focal length of the third lens element 130 is f3, the following condition is satisfied: |f/f1|+|f/f2|+|f/f3|=0.73.

When a composite focal length of the first lens element 110, the second lens element 120 and the third lens element 130 is f123, the focal length of the fourth lens element 140 is f4, the following condition is satisfied: f123/f4=1.58.

When the focal length of the photographing optical lens assembly is f, a curvature radius of the object-side surface 111 of the first lens element 110 is R1, a curvature radius of the image-side surface 112 of the first lens element 110 is R2, a curvature radius of the object-side surface 121 of the second lens element 120 is R3, a curvature radius of the image-side surface 122 of the second lens element 120 is R4, a curvature radius of the object-side surface 131 of the third lens element 130 is R5, a curvature radius of the image-side surface 132 of the third lens element 130 is R6, and the following condition is satisfied: (|R1|+|R2|+|R3|+|R4|+|R5|+|R6|)/f=3.00.

The detailed optical data of the 1st embodiment are shown in Table 1 and the aspheric surface data are shown in Table 2 below.

TABLE 1

1st Embodiment
f = 3.59 mm, Fno = 2.25, HFOV = 38.1deg.

| surface | | Curvature Radius | | Thickness | Material | Index | Abbe# | Focal Length |
|---|---|---|---|---|---|---|---|---|
| 0 | Object | Plano | | Infinity | | | | |
| 1 | Ape. Stop | Plano | | −0.185 | | | | |
| 2 | Lens 1 | 1.701 | (ASP) | 0.353 | Plastic | 1.544 | 55.9 | 32.17 |
| 3 | | 1.747 | (ASP) | 0.104 | | | | |
| 4 | Lens 2 | 1.194 | (ASP) | 0.258 | Plastic | 1.544 | 55.9 | 5.96 |
| 5 | | 1.745 | (ASP) | 0.082 | | | | |
| 6 | Lens 3 | 2.218 | (ASP) | 0.200 | Plastic | 1.544 | 55.9 | 321.19 |
| 7 | | 2.175 | (ASP) | 0.254 | | | | |
| 8 | Lens 4 | −11.788 | (ASP) | 0.595 | Plastic | 1.544 | 55.9 | 3.23 |
| 9 | | −1.555 | (ASP) | 0.050 | | | | |
| 10 | Lens 5 | −2.161 | (ASP) | 0.539 | Plastic | 1.639 | 23.5 | −3.07 |
| 11 | | 23.510 | (ASP) | 0.281 | | | | |
| 12 | Lens 6 | 1.236 | (ASP) | 0.753 | Plastic | 1.535 | 55.7 | 10.51 |
| 13 | | 1.247 | (ASP) | 0.300 | | | | |
| 14 | IR-cut filter | Plano | | 0.300 | Glass | 1.517 | 64.2 | — |
| 15 | | Plano | | 0.685 | | | | |
| 16 | Image | Plano | | — | | | | |

Note:
Reference wavelength is 587.6 nm (d-line).

TABLE 2

Aspheric Coefficients

| Surface # | | | | | |
|---|---|---|---|---|---|
| 2 | 3 | 4 | 5 | 6 | 7 |
| k = −4.4694E−02 | −9.3430E+00 | −3.6943E+00 | 1.2700E+00 | 3.0407E+00 | −1.1685E+01 |
| A4 = −3.6406E−02 | −9.6291E−02 | −3.1499E−03 | −1.5183E−01 | −4.4656E−01 | −1.3346E−01 |
| A6 = 8.5007E−02 | −3.4372E−02 | −1.0830E−01 | 5.0590E−02 | 3.3078E−01 | 3.6992E−02 |
| A8 = −2.1816E−01 | −6.8727E−02 | −4.3632E−01 | −8.7959E−01 | −9.4841E−01 | −3.3161E−01 |
| A10 = 3.3758E−01 | 2.1760E−01 | 2.2024E−01 | 3.7932E−01 | 1.6792E+00 | 1.4653E+00 |
| A12 = −2.5767E−01 | −2.2263E−01 | 3.8293E−01 | 9.4894E−01 | −1.0598E+00 | −1.6747E+00 |
| A14 = 2.5058E−02 | −4.8586E−02 | −5.7653E−01 | −6.9469E−01 | 1.8243E−01 | 5.8059E−01 |

| Surface # | | | | | |
|---|---|---|---|---|---|
| 8 | 9 | 10 | 11 | 12 | 13 |
| k = −3.0045E+01 | −5.8603E+00 | −1.8166E+01 | −4.9998E+01 | −7.0654E−01 | −1.2811E+00 |
| A4 = −1.8204E−02 | −1.9287E−01 | −3.4202E−01 | −4.6654E−01 | −6.0137E−01 | −2.6076E−01 |
| A6 = −1.5403E−01 | −6.9609E−02 | 5.3098E−01 | 8.1453E−01 | 5.1602E−01 | 1.4190E−01 |
| A8 = 4.5618E−01 | 1.2324E−01 | −1.2469E+00 | −1.0546E+00 | −4.6121E−01 | −6.4212E−02 |
| A10 = −1.1852E+00 | 2.0168E−02 | 2.0099E+00 | 8.9036E−01 | 2.8307E−01 | 2.0179E−02 |

TABLE 2-continued

Aspheric Coefficients

| A12 = | 1.8200E+00 | −2.9430E−02 | −1.6838E+00 | −4.2588E−01 | −9.9408E−02 | −4.0448E−03 |
|---|---|---|---|---|---|---|
| A14 = | −1.1296E+00 | 3.5687E−03 | 7.0849E−01 | 1.0476E−01 | 1.8265E−02 | 4.6146E−04 |
| A16 = | 1.9230E−01 | — | −1.3871E−01 | −1.0354E−02 | −1.3804E−03 | −2.2601E−05 |

In Table 1, the curvature radius, the thickness and the focal length are shown in millimeters (mm). Surface numbers 0-16 represent the surfaces sequentially arranged from the object-side to the image-side along the axial axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
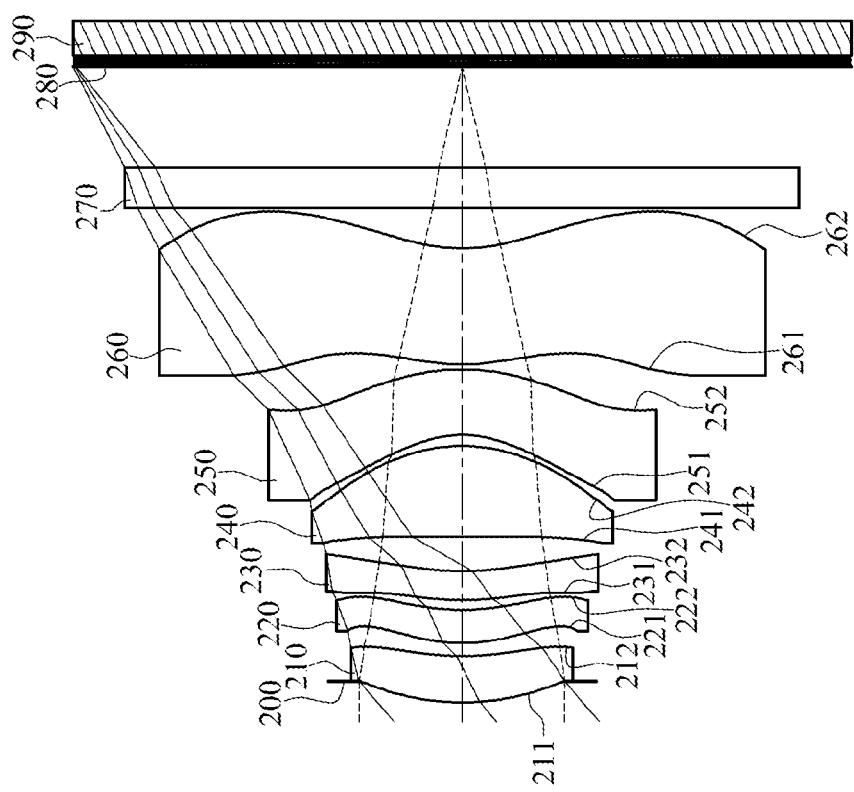
FIG. 3 is a schematic view of an image capturing unit according to the 2nd embodiment of the present disclosure.
Figure 4:
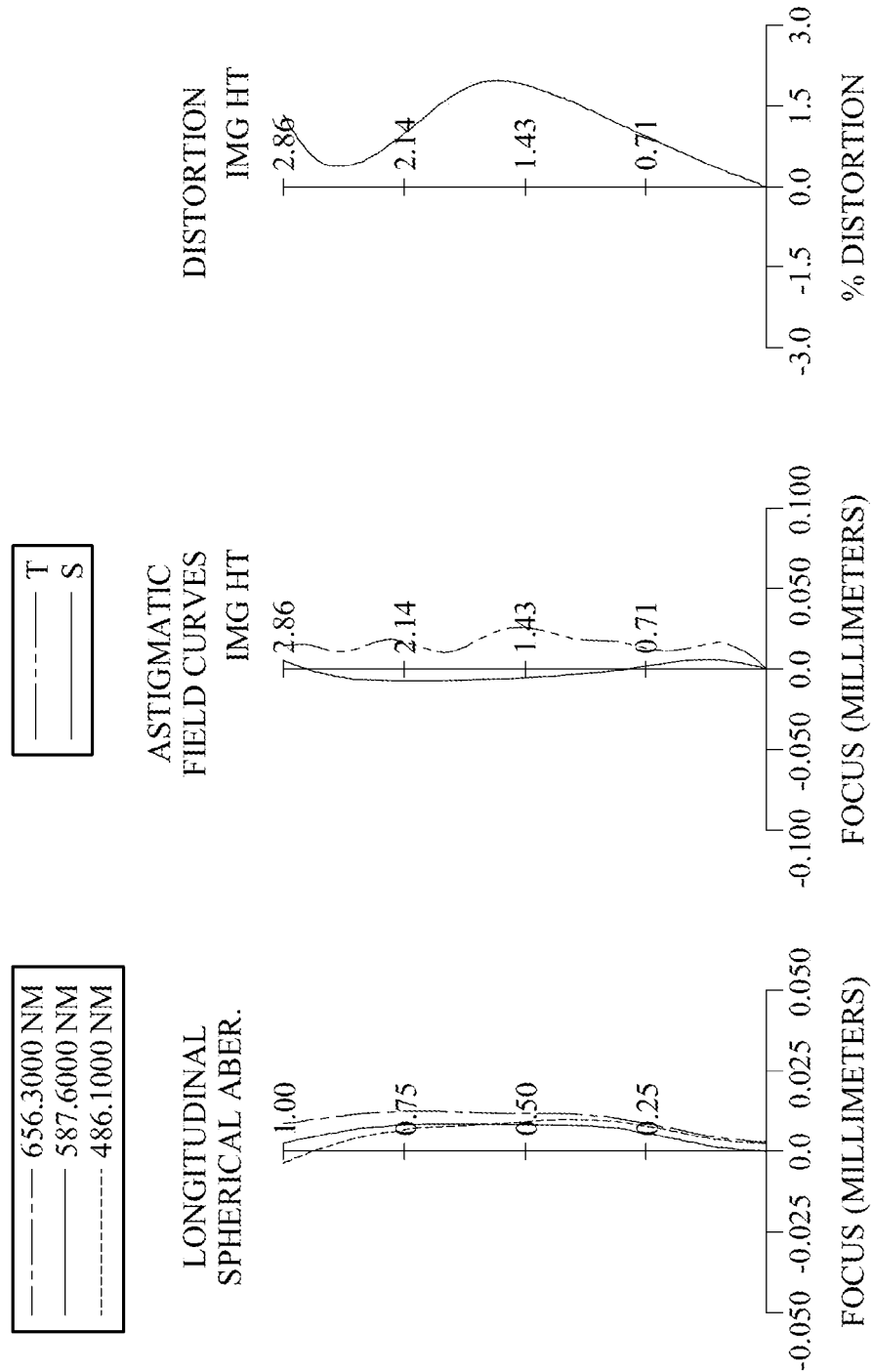
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 290. The photographing optical lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 270 and an image plane 280, wherein the photographing optical lens assembly has a total of six lens elements (210-260) with refractive power. There is an air gap in a paraxial region between any two of the first lens element 210, the second lens element 220, the third lens element 230, the fourth lens element 240, the fifth lens element 250 and the sixth lens element 260 that are adjacent to each other.

The first lens element 210 with positive refractive power has an object-side surface 211 being convex in a paraxial region thereof and an image-side surface 212 being concave in a paraxial region thereof. Both of the object-side surface 211 and the image-side surface 212 of the first lens element 210 have at least one inflection point. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being concave in a paraxial region thereof. The object-side surface 221 of the second lens element 220 has at least one concave shape in an off-axis region thereof. Both of the object-side surface 221 and the image-side surface 222 of the second lens element 220 have at least one inflection point. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. Both of the object-side surface 231 and the image-side surface 232 of the third lens element 230 have at least one inflection point. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with positive refractive power has an object-side surface 261 being convex in a paraxial region thereof and an image-side surface 262 being concave in a paraxial region thereof. The image-side surface 262 of the sixth lens element 260 has at least one convex shape in an off-axis region thereof. The sixth lens element 260 is made of plastic material and has the object-side surface 261 and the image-side surface 262 being both aspheric.

The IR-cut filter 270 is made of glass and located between the sixth lens element 260 and the image plane 280, and will not affect the focal length of the photographing optical lens assembly. The image sensor 290 is disposed on or near the image plane 280 of the photographing optical lens assembly.

The detailed optical data of the 2nd embodiment are shown in Table 3 and the aspheric surface data are shown in Table 4 below.

TABLE 3

2nd Embodiment
f = 3.33 mm, Fno = 2.20, HFOV = 40.2 deg.

| surface | | Curvature Radius | | Thickness | Material | Index | Abbe# | Focal Length |
|---|---|---|---|---|---|---|---|---|
| 0 | Object | Plano | | Infinity | | | | |
| 1 | Ape. Stop | Plano | | −0.156 | | | | |
| 2 | Lens 1 | 1.792 | (ASP) | 0.342 | Plastic | 1.544 | 55.9 | 22.29 |
| 3 | | 1.961 | (ASP) | 0.097 | | | | |

TABLE 3-continued

2nd Embodiment
f = 3.33 mm, Fno = 2.20, HFOV = 40.2 deg.

| surface | | Curvature Radius | | Thickness | Material | Index | Abbe# | Focal Length |
|---|---|---|---|---|---|---|---|---|
| 4 | Lens 2 | 1.324 | (ASP) | 0.245 | Plastic | 1.544 | 55.9 | 8.54 |
| 5 | | 1.730 | (ASP) | 0.071 | | | | |
| 6 | Lens 3 | 1.926 | (ASP) | 0.214 | Plastic | 1.544 | 55.9 | 36.25 |
| 7 | | 2.050 | (ASP) | 0.256 | | | | |
| 8 | Lens 4 | 42.585 | (ASP) | 0.669 | Plastic | 1.544 | 55.9 | 2.09 |
| 9 | | −1.162 | (ASP) | 0.082 | | | | |
| 10 | Lens 5 | −0.737 | (ASP) | 0.484 | Plastic | 1.650 | 21.4 | −2.92 |
| 11 | | −1.517 | (ASP) | 0.035 | | | | |
| 12 | Lens 6 | 1.465 | (ASP) | 0.858 | Plastic | 1.535 | 55.7 | 37.07 |
| 13 | | 1.259 | (ASP) | 0.300 | | | | |
| 14 | IR-cut filter | Plano | | 0.300 | Glass | 1.517 | 64.2 | — |
| 15 | | Plano | | 0.743 | | | | |
| 16 | Image | Plano | | — | | | | |

Note:
Reference wavelength is 587.6 nm (d-line).

TABLE 4

Aspheric Coefficients

| | Surface # | | | | | |
|---|---|---|---|---|---|---|
| | 2 | 3 | 4 | 5 | 6 | 7 |
| k = | 5.4007E−02 | −8.4396E+00 | −3.5772E+00 | 1.4637E+00 | 1.8924E+00 | −9.3246E+00 |
| A4 = | −2.7553E−02 | −1.0648E−01 | −2.9635E−02 | −1.8898E−01 | −4.0692E−01 | −7.8705E−02 |
| A6 = | 5.7689E−02 | −6.0032E−02 | −1.1689E−01 | 9.3961E−02 | 2.4836E−01 | −1.0176E−02 |
| A8 = | −2.0343E−01 | −5.2902E−02 | −4.0556E−01 | −8.5834E−01 | −7.8639E−01 | −3.8702E−01 |
| A10 = | 3.3423E−01 | 2.1050E−01 | 2.1513E−01 | 3.4633E−01 | 1.2140E+00 | 1.4648E+00 |
| A12 = | −2.6114E−01 | −3.6068E−01 | 3.2527E−01 | 9.1488E−01 | −5.7359E−01 | −1.6404E+00 |
| A14 = | −1.6040E−02 | 5.0990E−02 | −5.4953E−01 | −6.7797E−01 | 2.9900E−02 | 5.9649E−01 |

| | Surface # | | | | | |
|---|---|---|---|---|---|---|
| | 8 | 9 | 10 | 11 | 12 | 13 |
| k = | −1.3112E+00 | −5.1739E+00 | −4.8631E+00 | −1.6457E+01 | −5.6260E−01 | −1.7704E+00 |
| A4 = | −3.9818E−02 | −1.5090E−01 | −2.2948E−01 | −3.9191E−01 | −5.4367E−01 | −2.2783E−01 |
| A6 = | −9.1419E−02 | 8.5298E−03 | 6.4197E−01 | 7.9766E−01 | 5.1063E−01 | 1.4246E−01 |
| A8 = | 3.3575E−01 | −4.6691E−02 | −1.4747E+00 | −1.0267E+00 | −4.5969E−01 | −6.7803E−02 |
| A10 = | −1.0175E+00 | 1.1933E−01 | 2.1851E+00 | 8.5499E−01 | 2.7912E−01 | 2.1370E−02 |
| A12 = | 1.4977E+00 | −5.2740E−02 | −1.7554E+00 | −4.0601E−01 | −9.7579E−02 | −4.1906E−03 |
| A14 = | −8.8453E−01 | 2.9173E−03 | 7.0899E−01 | 9.9161E−02 | 1.7926E−02 | 4.6013E−04 |
| A16 = | 1.4685E−01 | — | −1.2049E−01 | −9.6925E−03 | −1.3572E−03 | −2.1482E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.33 | ΣCT/Td | 0.84 |
| Fno | 2.20 | f1/f2 | 2.61 |
| HFOV [deg.] | 40.2 | \|f/f1\| + \|f/f2\| + \|f/f3\| | 0.63 |
| CT1/CT2 | 1.40 | f123/f4 | 2.59 |
| Dr3r6/CT4 | 0.79 | (\|R1\| + \|R2\| + \|R3\| + \|R4\| + \|R5\| + \|R6\|)/f | 3.24 |

3rd Embodiment

Figure 5:
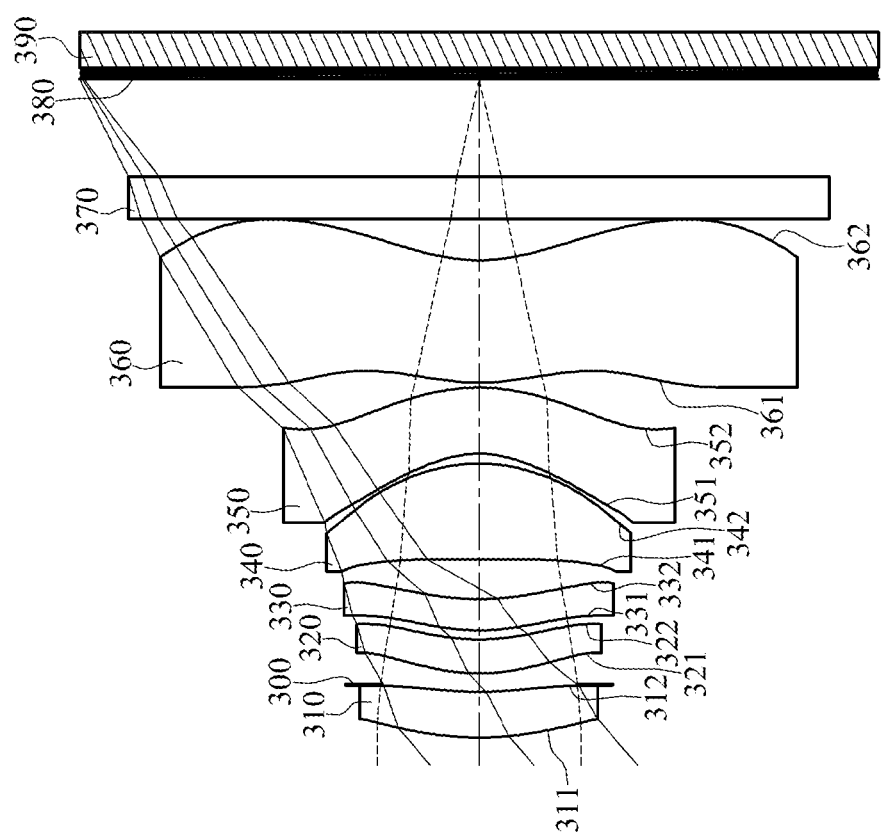
FIG. 5 is a schematic view of an image capturing unit according to the 3rd embodiment of the present disclosure.
Figure 6:
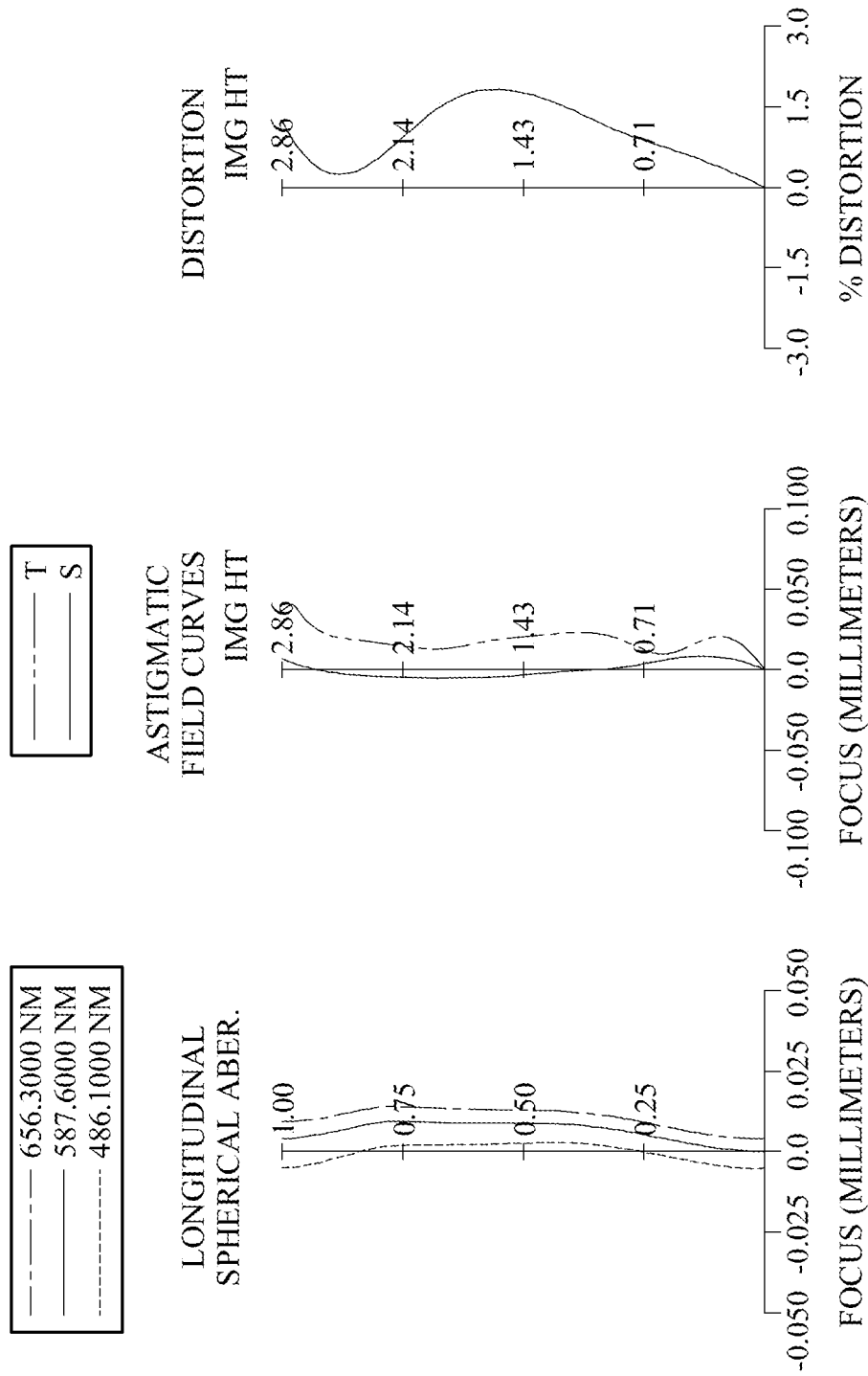
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 390. The photographing optical lens assembly includes, in order from an object side to an image side, a first lens element 310, an aperture stop 300, a second lens element 320, a third lens element 330, a fourth lens element 340, a fifth lens element 350, a sixth lens element 360, an IR-cut filter 370 and an image plane 380, wherein the photographing optical lens assembly has a total of six lens elements (310-360) with refractive power. There is an air gap in a paraxial region between any two of the first lens element 310, the second lens element 320, the third lens element 330, the fourth lens element 340, the fifth lens element 350 and the sixth lens element 360 that are adjacent to each other.

The first lens element 310 with positive refractive power has an object-side surface 311 being convex in a paraxial region thereof and an image-side surface 312 being concave in a paraxial region thereof. Both of the object-side surface 311 and the image-side surface 312 of the first lens element 310 have at least one inflection point. The first lens element 310 is made of plastic material and has the object-side surface 311 and the image-side surface 312 being both aspheric.

The second lens element 320 with positive refractive power has an object-side surface 321 being convex in a paraxial region thereof and an image-side surface 322 being concave in a paraxial region thereof. The object-side surface 321 of the second lens element 320 has at least one concave shape in an off-axis region thereof. Both of the object-side surface 321 and the image-side surface 322 of the second lens element 320 have at least one inflection point. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. Both of the object-side surface 331 and the image-side surface 332 of the third lens element 330 have at least one inflection point. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The image-side surface 362 of the sixth lens element 360 has at least one convex shape in an off-axis region thereof. The sixth lens element 360 is made of plastic material and has the object-side surface 361 and the image-side surface 362 being both aspheric.

The IR-cut filter 370 is made of glass and located between the sixth lens element 360 and the image plane 380, and will not affect the focal length of the photographing optical lens assembly. The image sensor 390 is disposed on or near the image plane 380 of the photographing optical lens assembly.

The detailed optical data of the 3rd embodiment are shown in Table 5 and the aspheric surface data are shown in Table 6 below.

TABLE 5

3rd Embodiment
f = 3.30 mm, Fno = 2.25, HFOV =40.5 deg.

| surface | | Curvature Radius | | Thickness | Material | Index | Abbe# | Focal Length |
|---|---|---|---|---|---|---|---|---|
| 0 | Object | Plano | | Infinity | | | | |
| 1 | Lens 1 | 2.242 | (ASP) | 0.333 | Plastic | 1.544 | 55.9 | 22.06 |
| 2 | | 2.612 | (ASP) | 0.052 | | | | |
| 3 | Ape. Stop | Plano | | 0.080 | | | | |
| 4 | Lens 2 | 1.383 | (ASP) | 0.245 | Plastic | 1.544 | 55.9 | 13.07 |
| 5 | | 1.610 | (ASP) | 0.065 | | | | |
| 6 | Lens 3 | 1.538 | (ASP) | 0.225 | Plastic | 1.544 | 55.9 | 11.56 |
| 7 | | 1.931 | (ASP) | 0.286 | | | | |
| 8 | Lens 4 | −114.374 | (ASP) | 0.693 | Plastic | 1.544 | 55.9 | 2.11 |
| 9 | | −1.139 | (ASP) | 0.072 | | | | |
| 10 | Lens 5 | −0.713 | (ASP) | 0.474 | Plastic | 1.639 | 23.5 | −3.12 |
| 11 | | −1.399 | (ASP) | 0.035 | | | | |
| 12 | Lens 6 | 1.556 | (ASP) | 0.884 | Plastic | 1.535 | 55.7 | −300.46 |
| 13 | | 1.236 | (ASP) | 0.300 | | | | |
| 14 | IR-cut filter | Plano | | 0.300 | Glass | 1.517 | 64.2 | — |
| 15 | | Plano | | 0.707 | | | | |
| 16 | Image | Plano | | — | | | | |

Note:
Reference wavelength is 587.6 nm (d-line).
Effective radius of surface 5 (the image-side surface of the second lens element) is 0.880 mm.

TABLE 6

Aspheric Coefficients

| Surface # | | | | | | |
|---|---|---|---|---|---|---|
| | 1 | 2 | 4 | 5 | 6 | 7 |
| k = | −7.5347E−01 | −1.7808E+01 | −3.6468E+00 | 1.8147E+00 | 1.2361E+00 | −6.4641E+00 |
| A4 = | −4.3210E−02 | −1.2931E−01 | −4.6417E−02 | −2.7617E−01 | −3.8544E−01 | −3.1241E−02 |
| A6 = | 2.3746E−02 | −3.6051E−02 | −5.5656E−02 | 1.4464E−01 | 2.7644E−01 | −4.4831E−02 |

TABLE 6-continued

Aspheric Coefficients

| A8 = | −1.1740E−01 | 5.4378E−03 | −2.4889E−01 | −7.6965E−01 | −8.6328E−01 | −2.2479E−01 |
| A10 = | 1.7877E−01 | 2.5162E−01 | 2.3123E−01 | 3.4957E−01 | 1.0811E+00 | 6.9417E−01 |
| A12 = | −1.7396E−01 | −5.3835E−01 | 2.9077E−01 | 8.0385E−01 | −5.9833E−01 | −6.8066E−01 |
| A14 = | 5.0878E−02 | 3.2564E−01 | −4.0315E−01 | −7.8186E−01 | 8.9531E−02 | 2.0453E−01 |
| A16 = | −6.0168E−08 | 4.1672E−10 | −3.0448E−06 | −9.0497E−07 | 1.3144E−02 | −1.7710E−02 |

Surface #

| | 8 | 9 | 10 | 11 | 12 | 13 |
|---|---|---|---|---|---|---|
| k = | 2.0000E+01 | −6.6185E+00 | −4.9820E+00 | −1.4934E+01 | −3.4139E−01 | −3.9270E+00 |
| A4 = | −4.5075E−02 | −1.9083E−01 | −2.3994E−01 | −3.8150E−01 | −4.9470E−01 | −1.0692E−01 |
| A6 = | −7.6487E−02 | 1.2441E−02 | 6.3469E−01 | 7.9716E−01 | 4.4669E−01 | 5.6421E−02 |
| A8 = | 1.4712E−01 | −4.4735E−02 | −1.4894E+00 | −1.0276E+00 | −3.9405E−01 | −2.5291E−02 |
| A10 = | −2.6982E−01 | 1.0921E−01 | 2.1897E+00 | 8.5482E−01 | 2.3698E−01 | 7.5999E−03 |
| A12 = | −1.5778E−02 | −5.6461E−02 | −1.7459E+00 | −4.0602E−01 | −8.2845E−02 | −1.4531E−03 |
| A14 = | 5.6279E−01 | 1.0965E−02 | 7.1270E−01 | 9.9200E−02 | 1.5247E−02 | 1.5923E−04 |
| A16 = | −3.9628E−01 | −6.5371E−04 | −1.2578E−01 | −9.6715E−03 | −1.1599E−03 | −7.5390E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.30 | ΣCT/Td | 0.83 |
| Fno | 2.25 | f1/f2 | 1.69 |
| HFOV [deg.] | 40.5 | \|f/f1\| + \|f/f2\| + \|f/f3\| | 0.69 |
| CT1/CT2 | 1.36 | f123/f4 | 2.37 |
| Dr3r6/CT4 | 0.77 | (\|R1\| + \|R2\| + \|R3\| + \|R4\| + \|R5\| + \|R6\|)/f | 3.43 |

4th Embodiment

Figure 7:
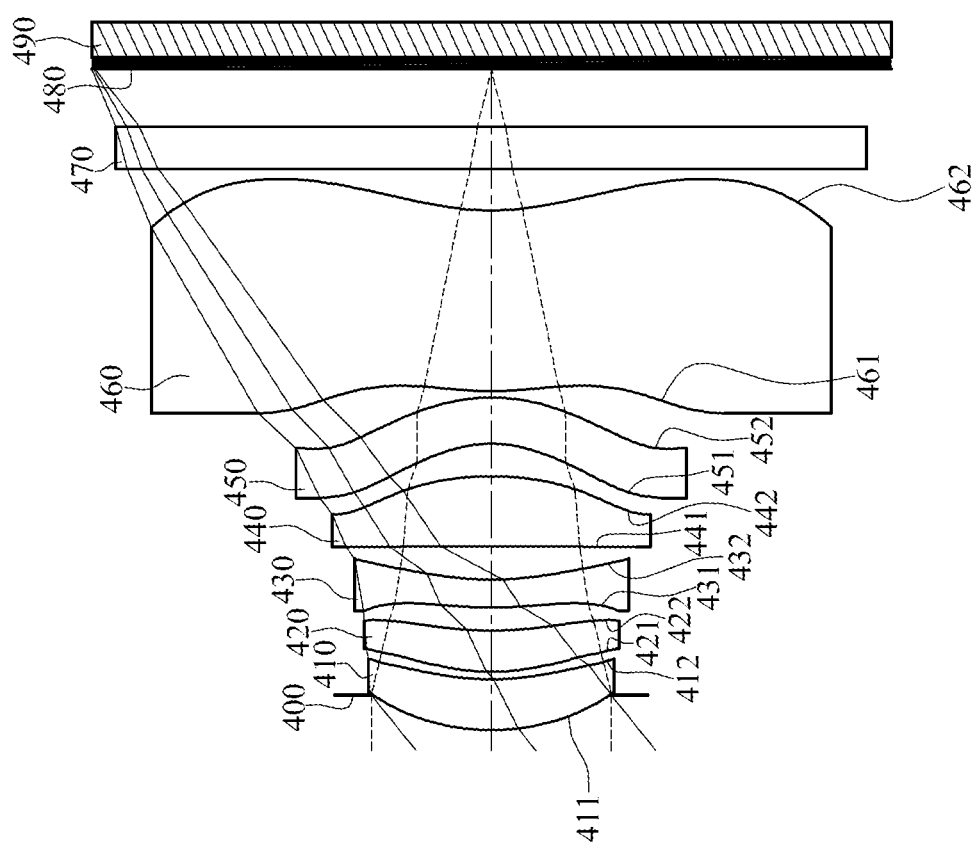
FIG. 7 is a schematic view of an image capturing unit according to the 4th embodiment of the present disclosure.
Figure 8:
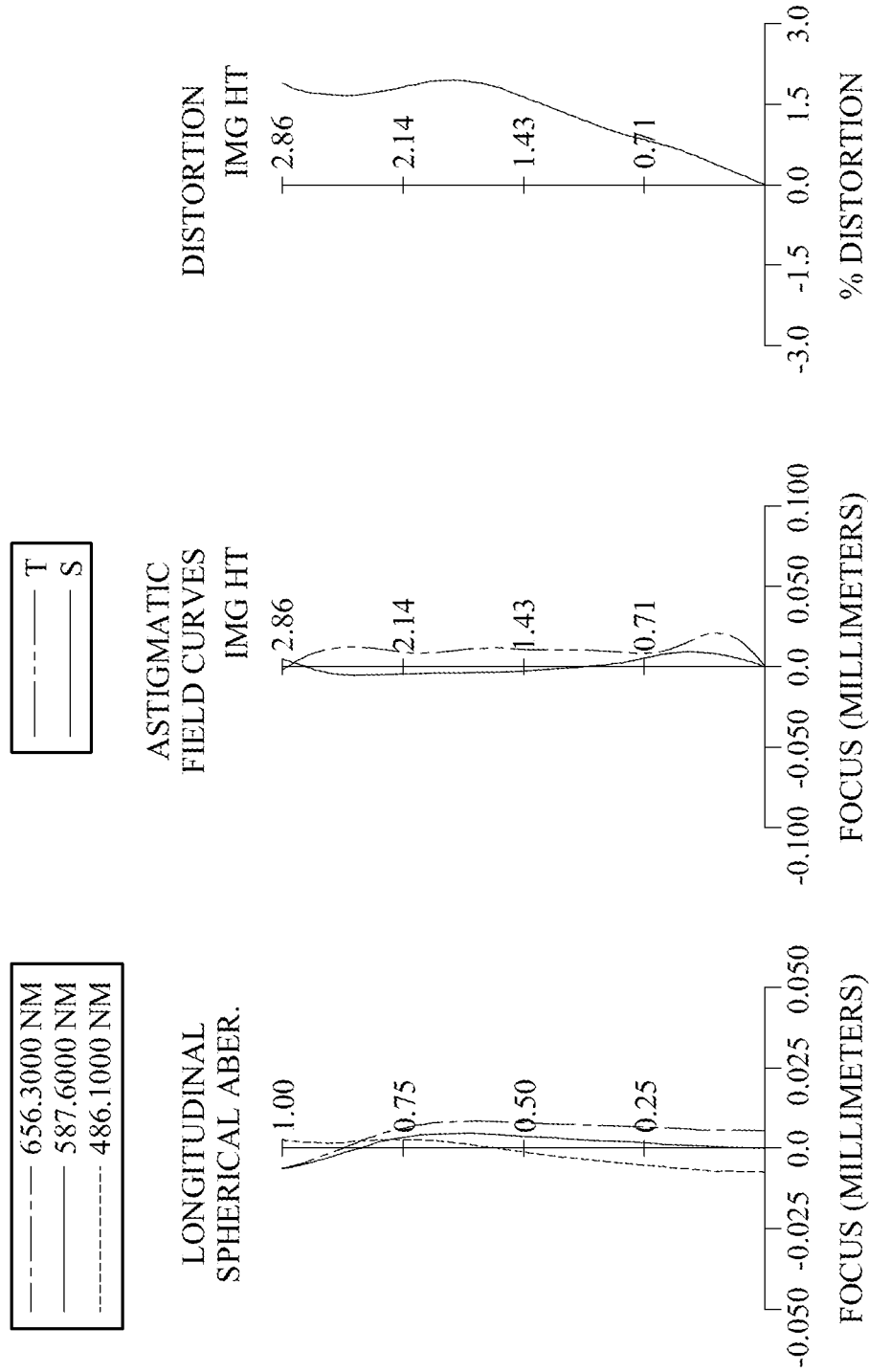
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 490. The photographing optical lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image plane 480, wherein the photographing optical lens assembly has a total of six lens elements (410-460) with refractive power. There is an air gap in a paraxial region between any two of the first lens element 410, the second lens element 420, the third lens element 430, the fourth lens element 440, the fifth lens element 450 and the sixth lens element 460 that are adjacent to each other.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The object-side surface 421 of the second lens element 420 has at least one concave shape in an off-axis region thereof. Both of the object-side surface 421 and the image-side surface 422 of the second lens element 420 have at least one inflection point. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The object-side surface 431 of the third lens element 430 has at least one inflection point. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with positive refractive power has an object-side surface 461 being convex in a paraxial region thereof and an image-side surface 462 being concave in a paraxial region thereof. The image-side surface 462 of the sixth lens element 460 has at least one convex shape in an off-axis region thereof. The sixth lens element 460 is made of plastic material and has the object-side surface 461 and the image-side surface 462 being both aspheric.

The IR-cut filter 470 is made of glass and located between the sixth lens element 460 and the image plane 480, and will not affect the focal length of the photographing optical lens assembly. The image sensor 490 is disposed on or near the image plane 480 of the photographing optical lens assembly.

The detailed optical data of the 4th embodiment are shown in Table 7 and the aspheric surface data are shown in Table 8 below.

TABLE 7

4th Embodiment
f = 3.53 mm, Fno = 2.05, HFOV = 38.4 deg.

| surface | | Curvature Radius | | Thickness | Material | Index | Abbe# | Focal Length |
|---|---|---|---|---|---|---|---|---|
| 0 | Object | Plano | | Infinity | | | | |
| 1 | Ape. Stop | Plano | | −0.254 | | | | |
| 2 | Lens 1 | 1.599 | (ASP) | 0.365 | Plastic | 1.560 | 57.5 | 13.98 |
| 3 | | 1.844 | (ASP) | 0.054 | | | | |
| 4 | Lens 2 | 1.515 | (ASP) | 0.297 | Plastic | 1.560 | 57.5 | 5.78 |
| 5 | | 2.648 | (ASP) | 0.166 | | | | |
| 6 | Lens 3 | 3.036 | (ASP) | 0.200 | Plastic | 1.639 | 23.5 | −13.18 |
| 7 | | 2.175 | (ASP) | 0.238 | | | | |
| 8 | Lens 4 | 29.996 | (ASP) | 0.505 | Plastic | 1.560 | 57.5 | 3.49 |
| 9 | | −2.077 | (ASP) | 0.235 | | | | |
| 10 | Lens 5 | −0.835 | (ASP) | 0.331 | Plastic | 1.650 | 21.5 | −5.02 |
| 11 | | −1.297 | (ASP) | 0.045 | | | | |
| 12 | Lens 6 | 2.174 | (ASP) | 1.300 | Plastic | 1.535 | 55.7 | 50.85 |
| 13 | | 1.871 | (ASP) | 0.300 | | | | |
| 14 | IR-cut filter | Plano | | 0.300 | Glass | 1.517 | 64.2 | — |
| 15 | | Plano | | 0.417 | | | | |
| 16 | Image | Plano | | — | | | | |

Note:
Reference wavelength is 587.6 nm (d-line).

TABLE 8

Aspheric Coefficients

| | Surface # | | | | | |
|---|---|---|---|---|---|---|
| | 2 | 3 | 4 | 5 | 6 | 7 |
| k = | 3.3936E−01 | −9.6136E+00 | −4.9363E+00 | 6.1135E+00 | 4.9160E+00 | −1.1171E+01 |
| A4 = | −1.1852E−02 | −5.9185E−03 | −2.6788E−02 | −1.0288E−01 | −2.4599E−01 | −3.1379E−02 |
| A6 = | 4.9655E−02 | −2.6623E−02 | −4.0969E−02 | −6.5521E−02 | 1.1104E−01 | 1.1201E−01 |
| A8 = | −1.3740E−01 | −2.1649E−01 | −2.8445E−01 | −3.6841E−01 | −6.8215E−01 | −6.0872E−01 |
| A10 = | 2.3744E−01 | 5.1951E−01 | 2.6852E−01 | 3.3276E−01 | 1.1415E+00 | 1.3719E+00 |
| A12 = | −2.0792E−01 | −2.6380E−01 | 5.3902E−01 | 5.2193E−01 | −7.4080E−01 | −1.3550E+00 |
| A14 = | 8.8034E−02 | −4.2912E−03 | −5.5925E−01 | −6.3457E−01 | 1.3559E−01 | 5.0344E−01 |

| | Surface # | | | | | |
|---|---|---|---|---|---|---|
| | 8 | 9 | 10 | 11 | 12 | 13 |
| k = | −1.0006E+01 | −1.6300E+01 | −6.3675E+00 | −1.3594E+01 | −3.9202E−01 | −4.5620E+00 |
| A4 = | −4.7421E−02 | −2.2405E−01 | −3.4712E−01 | −4.6838E−01 | −4.6666E−01 | −7.8668E−02 |
| A6 = | −7.9729E−02 | 1.0426E−01 | 7.6959E−01 | 8.3997E−01 | 4.6148E−01 | 3.4434E−02 |
| A8 = | 4.4855E−01 | −5.9253E−02 | −1.4811E+00 | −1.0218E+00 | −4.0382E−01 | −1.1789E−02 |
| A10 = | −1.0172E+00 | 1.1709E−01 | 2.1568E+00 | 8.5166E−01 | 2.3655E−01 | 2.4473E−03 |
| A12 = | 1.3776E+00 | −2.8073E−02 | −1.7550E+00 | −4.0679E−01 | −7.9215E−02 | −2.9729E−04 |
| A14 = | −9.5887E−01 | −1.0998E−02 | 7.2638E−01 | 9.9283E−02 | 1.3811E−02 | 1.8785E−05 |
| A16 = | 2.5678E−01 | — | −1.2146E−01 | −9.6821E−03 | −9.7899E−04 | −4.4707E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.53 | ΣCT/Td | 0.80 |
| Fno | 2.05 | f1/f2 | 2.42 |

-continued

| 4th Embodiment | | | |
|---|---|---|---|
| HFOV [deg.] | 38.4 | \|f/f1\| + \|f/f2\| + \|f/f3\| | 1.13 |
| CT1/CT2 | 1.23 | f123/f4 | 1.59 |
| Dr3r6/CT4 | 1.31 | (\|R1\| + \|R2\| + \|R3\| + \|R4\| + \|R5\| + \|R6\|)/f | 3.63 |

5th Embodiment

Figure 9:
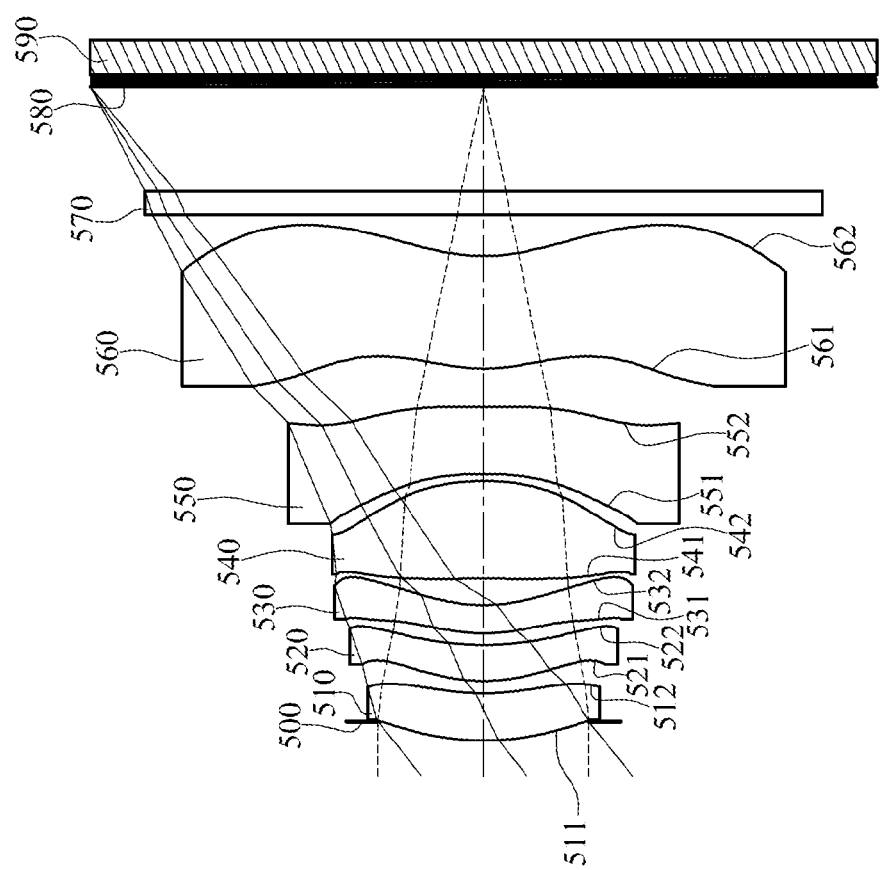
FIG. 9 is a schematic view of an image capturing unit according to the 5th embodiment of the present disclosure.
Figure 10:
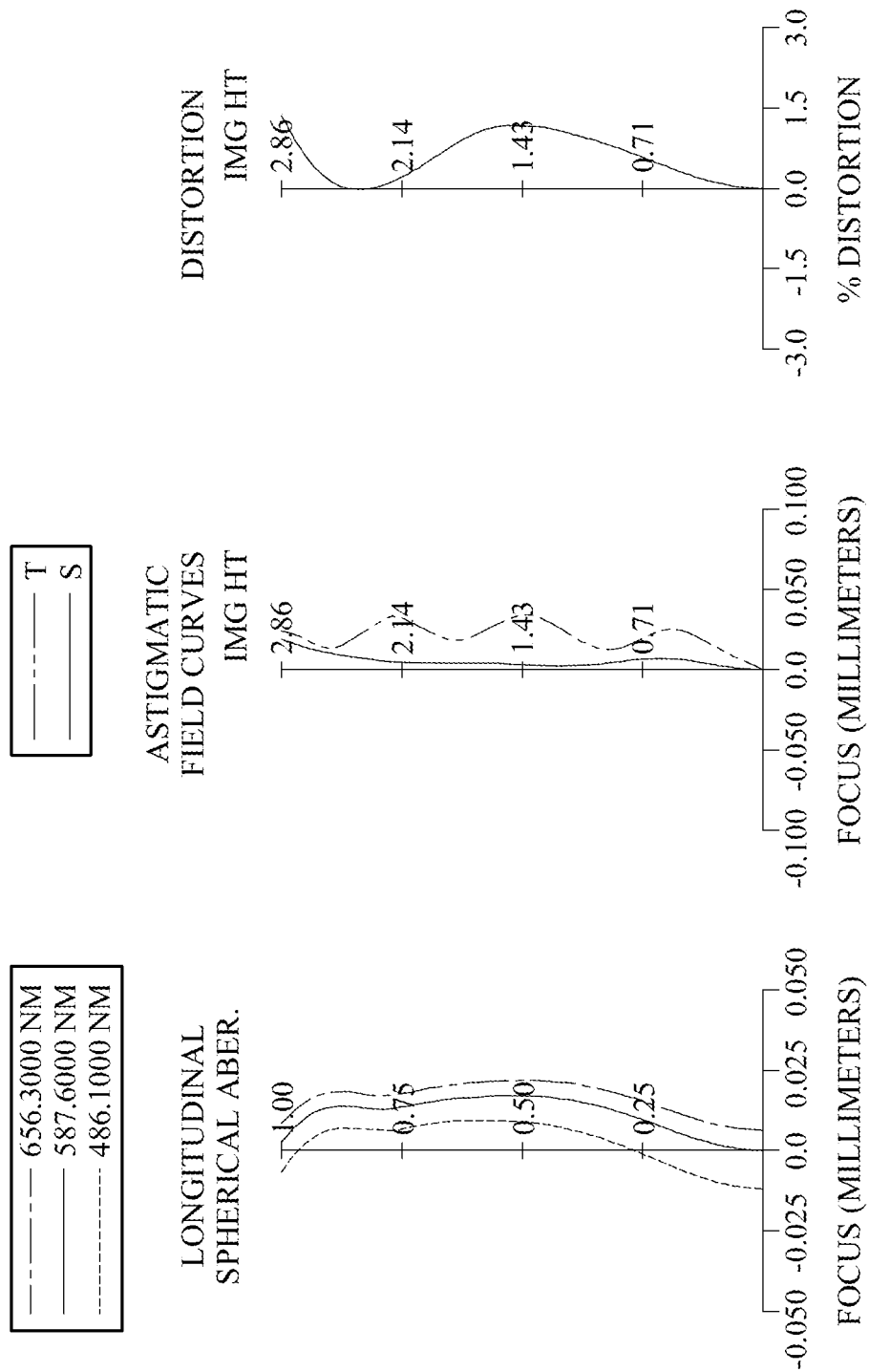
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 590. The photographing optical lens assembly includes, in order from an object side to an image side, an aperture stop 500, a first lens element 510, a second lens element 520, a third lens element 530, a fourth lens element 540, a fifth lens element 550, a sixth lens element 560, an IR-cut filter 570 and an image plane 580, wherein the photographing optical lens assembly has a total of six lens elements (510-560) with refractive power. There is an air gap in a paraxial region is between any two of the first lens element 510, the second lens element 520, the third lens element 530, the fourth lens element 540, the fifth lens element 550 and the sixth lens element 560 that are adjacent to each other.

The first lens element 510 with positive refractive power has an object-side surface 511 being convex in a paraxial region thereof and an image-side surface 512 being concave in a paraxial region thereof. Both of the object-side surface 511 and the image-side surface 512 of the first lens element 510 have at least one inflection point. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The object-side surface 521 of the second lens element 520 has at least one concave shape in an off-axis region thereof. Both of the object-side surface 521 and the image-side surface 522 of the second lens element 520 have at least one inflection point. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. Both of the object-side surface 531 and the image-side surface 532 of the third lens element 530 have at least one inflection point. The third lens element 530 is made of plastic material and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric.

The sixth lens element 560 with positive refractive power has an object-side surface 561 being convex in a paraxial region thereof and an image-side surface 562 being concave in a paraxial region thereof. The image-side surface 562 of the sixth lens element 560 has at least one convex shape in an off-axis region thereof. The sixth lens element 560 is made of plastic material and has the object-side surface 561 and the image-side surface 562 being both aspheric.

The IR-cut filter 570 is made of glass and located between the sixth lens element 560 and the image plane 580, and will not affect the focal length of the photographing optical lens assembly. The image sensor 590 is disposed on or near the image plane 580 of the photographing optical lens assembly.

The detailed optical data of the 5th embodiment are shown in Table 9 and the aspheric surface data are shown in Table 10 below.

TABLE 9

5th Embodiment
f = 3.55 mm, Fno = 2.32, HFOV = 38.3 deg.

| surface | | Curvature Radius | | Thickness | Material | Index | Abbe# | Focal Length |
|---|---|---|---|---|---|---|---|---|
| 0 | Object | Plano | | Infinity | | | | |
| 1 | Ape. Stop | Plano | | −0.139 | | | | |
| 2 | Lens 1 | 1.843 | (ASP) | 0.343 | Plastic | 1.514 | 56.8 | 357.82 |
| 3 | | 1.744 | (ASP) | 0.091 | | | | |
| 4 | Lens 2 | 1.327 | (ASP) | 0.260 | Plastic | 1.544 | 55.9 | 5.72 |
| 5 | | 2.152 | (ASP) | 0.086 | | | | |
| 6 | Lens 3 | 1.294 | (ASP) | 0.204 | Plastic | 1.544 | 55.9 | −123.83 |
| 7 | | 1.199 | (ASP) | 0.192 | | | | |
| 8 | Lens 4 | −28.639 | (ASP) | 0.711 | Plastic | 1.544 | 55.9 | 3.80 |
| 9 | | −1.947 | (ASP) | 0.050 | | | | |
| 10 | Lens 5 | −3.506 | (ASP) | 0.486 | Plastic | 1.633 | 23.4 | −3.88 |
| 11 | | 8.660 | (ASP) | 0.280 | | | | |
| 12 | Lens 6 | 1.258 | (ASP) | 0.819 | Plastic | 1.535 | 55.7 | 9.24 |
| 13 | | 1.304 | (ASP) | 0.300 | | | | |
| 14 | IR-cut filter | Plano | | 0.175 | Glass | 1.517 | 64.2 | — |
| 15 | | Plano | | 0.757 | | | | |
| 16 | Image | Plano | | — | | | | |

Note:
Reference wavelength is 587.6 nm (d-line).

TABLE 10

Aspheric Coefficients

| Surface # | 2 | 3 | 4 | 5 | 6 | 7 |
|---|---|---|---|---|---|---|
| k = | −3.8490E−01 | −7.9572E+00 | −2.7565E+00 | 3.5833E+00 | −3.9988E−02 | −5.6351E+00 |
| A4 = | −4.6543E−02 | −1.1944E−01 | 7.0433E−03 | −1.5574E−01 | −5.5274E−01 | 1.2611E−01 |
| A6 = | 6.2987E−02 | −1.5403E−01 | −8.7082E−02 | 4.3400E−01 | 2.4644E−01 | −7.5362E−01 |
| A8 = | −2.4029E−01 | −5.7010E−02 | −2.9388E−01 | −1.0701E+00 | −6.5975E−01 | 1.3890E+00 |
| A10 = | 5.4912E−01 | 4.3849E−01 | −4.6186E−02 | 4.1111E−01 | 1.4427E+00 | −1.4029E+00 |
| A12 = | −7.4216E−01 | −6.3460E−01 | 2.6966E−01 | 8.7231E−01 | −8.9361E−01 | 8.2849E−01 |
| A14 = | 3.2049E−01 | 2.4876E−01 | −1.9897E−01 | −7.9116E−01 | 5.4804E−02 | −2.6101E−01 |

| Surface # | 8 | 9 | 10 | 11 | 12 | 13 |
|---|---|---|---|---|---|---|
| k = | −1.0834E+01 | −1.0067E+00 | −3.9328E+01 | −2.4664E+00 | −6.8646E−01 | −1.1558E+00 |
| A4 = | 8.5749E−02 | −5.8589E−01 | −8.4811E−01 | −6.4960E−01 | −6.6802E−01 | −2.7852E−01 |
| A6 = | −5.9867E−02 | 1.5796E+00 | 2.1574E+00 | 1.2294E+00 | 5.9956E−01 | 1.5701E−01 |
| A8 = | 3.2292E−01 | −3.0255E+00 | −3.9771E+00 | −1.5933E+00 | −4.9153E−01 | −7.1130E−02 |
| A10 = | −7.0747E−01 | 3.7494E+00 | 4.8839E+00 | 1.3715E+00 | 2.8246E−01 | 2.2019E−02 |
| A12 = | 8.0248E−01 | −2.6604E+00 | −3.5243E+00 | −6.9224E−01 | −9.6393E−02 | −4.3236E−03 |
| A14 = | −4.5328E−01 | 9.6093E−01 | 1.3176E+00 | 1.8389E−01 | 1.7545E−02 | 4.8254E−04 |
| A16 = | 7.7647E−02 | −1.2206E−01 | −1.9756E−01 | −1.9912E−02 | −1.3262E−03 | −2.3172E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.55 | ΣCT/Td | 0.80 |
| Fno | 2.32 | f1/f2 | 62.56 |
| HFOV [deg.] | 38.3 | \|f/f1\| + \|f/f2\| + \|f/f3\| | 0.66 |
| CT1/CT2 | 1.32 | f123/f4 | 1.55 |
| Dr3r6/CT4 | 0.77 | (\|R1\| + \|R2\| + \|R3\| + \|R4\| + \|R5\| + \|R6\|)/f | 2.69 |

6th Embodiment

Figure 11:
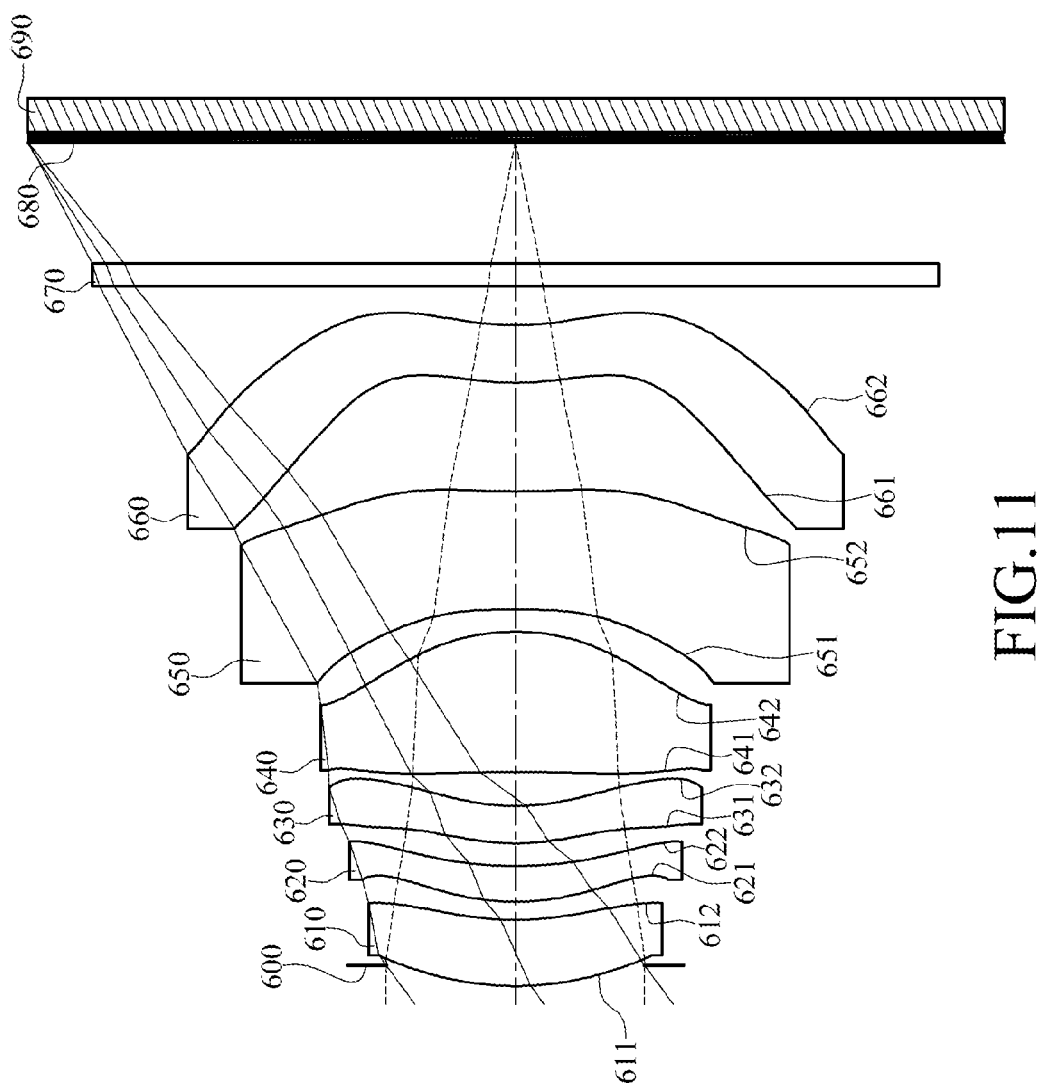
FIG. 11 is a schematic view of an image capturing unit according to the 6th embodiment of the present disclosure.
Figure 12:
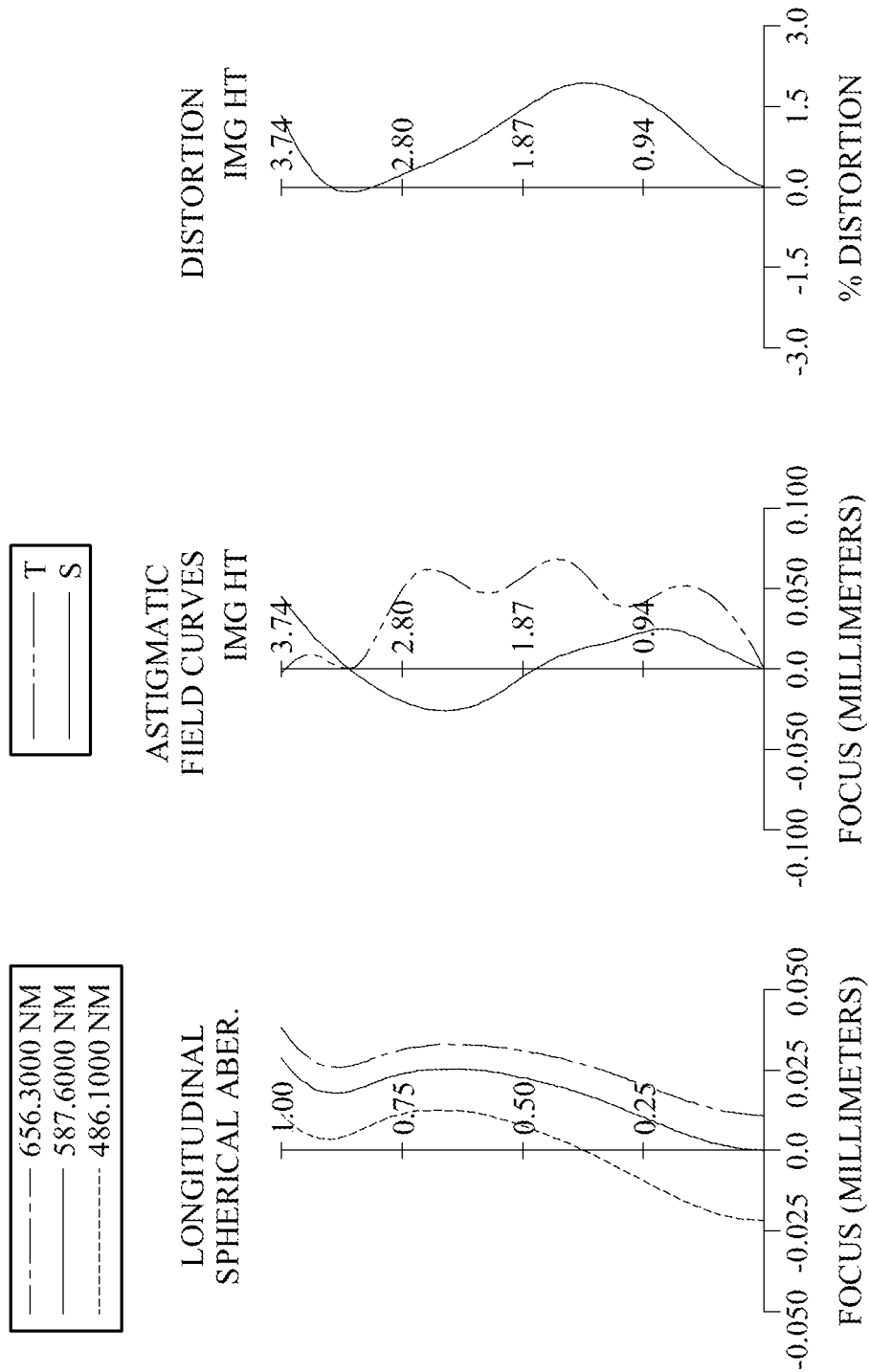
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 690. The photographing optical lens assembly includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image plane 680, wherein the photographing optical lens assembly has a total of six lens elements (610-660) with refractive power. There is an air gap in a paraxial region is between any two of the first lens element 610, the second lens element 620, the third lens element 630, the fourth lens element 640, the fifth lens element 650 and the sixth lens element 660 that are adjacent to each other.

The first lens element 610 with positive refractive power has an object-side surface 611 being convex in a paraxial region thereof and an image-side surface 612 being concave in a paraxial region thereof. The image-side surface 612 of the first lens element 610 has at least one inflection point. The first lens element 610 is made of plastic material and has the object-side surface 611 and the image-side surface 612 being both aspheric.

The second lens element 620 with positive refractive power has an object-side surface 621 being convex in a paraxial region thereof and an image-side surface 622 being concave in a paraxial region thereof. The object-side surface 621 of the second lens element 620 has at least one concave shape in an off-axis region thereof. The object-side surface 621 of the second lens element 620 has at least one inflection point. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. Both of the object-side surface 631 and the image-side surface 632 of the third lens element 630 have at least one inflection point. The third lens element 630 is made of plastic material and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric.

The sixth lens element 660 with positive refractive power has an object-side surface 661 being convex in a paraxial region thereof and an image-side surface 662 being concave in a paraxial region thereof. The image-side surface 662 of the sixth lens element 660 has at least one convex shape in an off-axis region thereof. The sixth lens element 660 is made of plastic material and has the object-side surface 661 and the image-side surface 662 being both aspheric.

The IR-cut filter 670 is made of glass and located between the sixth lens element 660 and the image plane 680, and will not affect the focal length of the photographing optical lens assembly. The image sensor 690 is disposed on or near the image plane 680 of the photographing optical lens assembly.

The detailed optical data of the 6th embodiment are shown in Table 11 and the aspheric surface data are shown in Table 12 below.

TABLE 11

6th Embodiment
f = 4.99 mm, Fno = 2.52, HFOV = 36.4 deg.

| surface | | Curvature Radius | | Thickness | Material | Index | Abbe# | Focal Length |
|---|---|---|---|---|---|---|---|---|
| 0 | Object | Plano | | Infinity | | | | |
| 1 | Ape. Stop | Plano | | −0.159 | | | | |
| 2 | Lens 1 | 2.298 | (ASP) | 0.508 | Plastic | 1.514 | 56.8 | 74.18 |
| 3 | | 2.263 | (ASP) | 0.139 | | | | |
| 4 | Lens 2 | 1.876 | (ASP) | 0.274 | Plastic | 1.544 | 55.9 | 8.74 |
| 5 | | 2.940 | (ASP) | 0.174 | | | | |
| 6 | Lens 3 | 1.800 | (ASP) | 0.287 | Plastic | 1.544 | 55.9 | −248.23 |
| 7 | | 1.677 | (ASP) | 0.261 | | | | |
| 8 | Lens 4 | −12.155 | (ASP) | 1.076 | Plastic | 1.544 | 55.9 | 3.90 |
| 9 | | −1.861 | (ASP) | 0.171 | | | | |
| 10 | Lens 5 | −10.987 | (ASP) | 0.906 | Plastic | 1.633 | 23.4 | −4.95 |
| 11 | | 4.520 | (ASP) | 0.835 | | | | |
| 12 | Lens 6 | 2.115 | (ASP) | 0.442 | Plastic | 1.535 | 55.7 | 226.30 |
| 13 | | 1.995 | (ASP) | 0.300 | | | | |
| 14 | IR-cut filter | Plano | | 0.175 | Glass | 1.517 | 64.2 | — |
| 15 | | Plano | | 0.926 | | | | |
| 16 | Image | Plano | | — | | | | |

Note:
Reference wavelength is 587.6 nm (d-line).

TABLE 12

Aspheric Coefficients

| Surface # | | | | | |
|---|---|---|---|---|---|
| 2 | 3 | 4 | 5 | 6 | 7 |
| k = −2.4498E−01 | −5.7037E+00 | −2.4181E+00 | 3.5819E+00 | −4.7506E−02 | −6.9356E+00 |
| A4 = −1.6562E−02 | −3.8356E−02 | 5.1440E−03 | −5.4489E−02 | −2.1981E−01 | 4.7859E−02 |
| A6 = 1.2732E−02 | −2.7635E−02 | −2.0459E−02 | 9.1351E−02 | 5.2826E−02 | −1.7363E−01 |
| A8 = −2.4936E−02 | −3.2682E−03 | −3.4973E−02 | −1.3443E−01 | −7.4331E−02 | 1.5856E−01 |
| A10 = 3.4663E−02 | 2.8258E−02 | −1.5714E−03 | 4.7028E−02 | 8.7457E−02 | −8.1780E−02 |
| A12 = −2.2559E−02 | −2.0560E−02 | 9.3584E−03 | 1.1824E−02 | −2.8960E−02 | 2.4674E−02 |
| A14 = 5.0727E−03 | 4.0176E−03 | −4.5113E−03 | −9.3120E−03 | 1.0969E−03 | −4.0053E−03 |

| Surface # | | | | | |
|---|---|---|---|---|---|
| 8 | 9 | 10 | 11 | 12 | 13 |
| k = −3.5539E+01 | −2.5980E+00 | −3.9328E+01 | −4.4540E+01 | −7.3625E−01 | −1.8348E+00 |
| A4 = 3.2821E−02 | −2.4346E−01 | −3.7819E−01 | −2.0609E−01 | −2.7160E−01 | −6.8882E+00 |
| A6 = −1.1807E−02 | 3.5491E−01 | 4.4152E−01 | 1.5677E−01 | 9.2925E−02 | 1.0543E+01 |
| A8 = 3.6579E−02 | −3.1565E−01 | −3.3002E−01 | −9.4887E−02 | −1.0766E−01 | −2.1570E+01 |
| A10 = −4.3025E−02 | 1.7789E−01 | 1.5711E−01 | 4.1728E−02 | 7.6066E−02 | 5.2024E+01 |
| A12 = 2.5954E−02 | −5.8231E−02 | −4.3689E−02 | −1.1246E−02 | −2.4850E−02 | −7.0938E+01 |
| A14 = −7.8997E−03 | 1.0164E−02 | 5.5652E−03 | 1.6303E−03 | 3.8364E−03 | 4.5191E+01 |
| A16 = 7.7568E−04 | −6.9417E−04 | −1.8827E−04 | −9.7546E−05 | −2.2845E−04 | −1.0578E+01 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | |
|---|---|---|
| f [mm] | 4.99 | ΣCT/Td | 0.69 |
| Fno | 2.52 | f1/f2 | 8.49 |
| HFOV [deg.] | 36.4 | \|f/f1\| + \|f/f2\| + \|f/f3\| | 0.66 |
| CT1/CT2 | 1.85 | f123/f4 | 2.08 |
| Dr3r6/CT4 | 0.68 | (\|R1\| + \|R2\| + \|R3\| + \|R4\| + \|R5\| + \|R6\|)/f | 2.58 |

7th Embodiment

Figure 13:
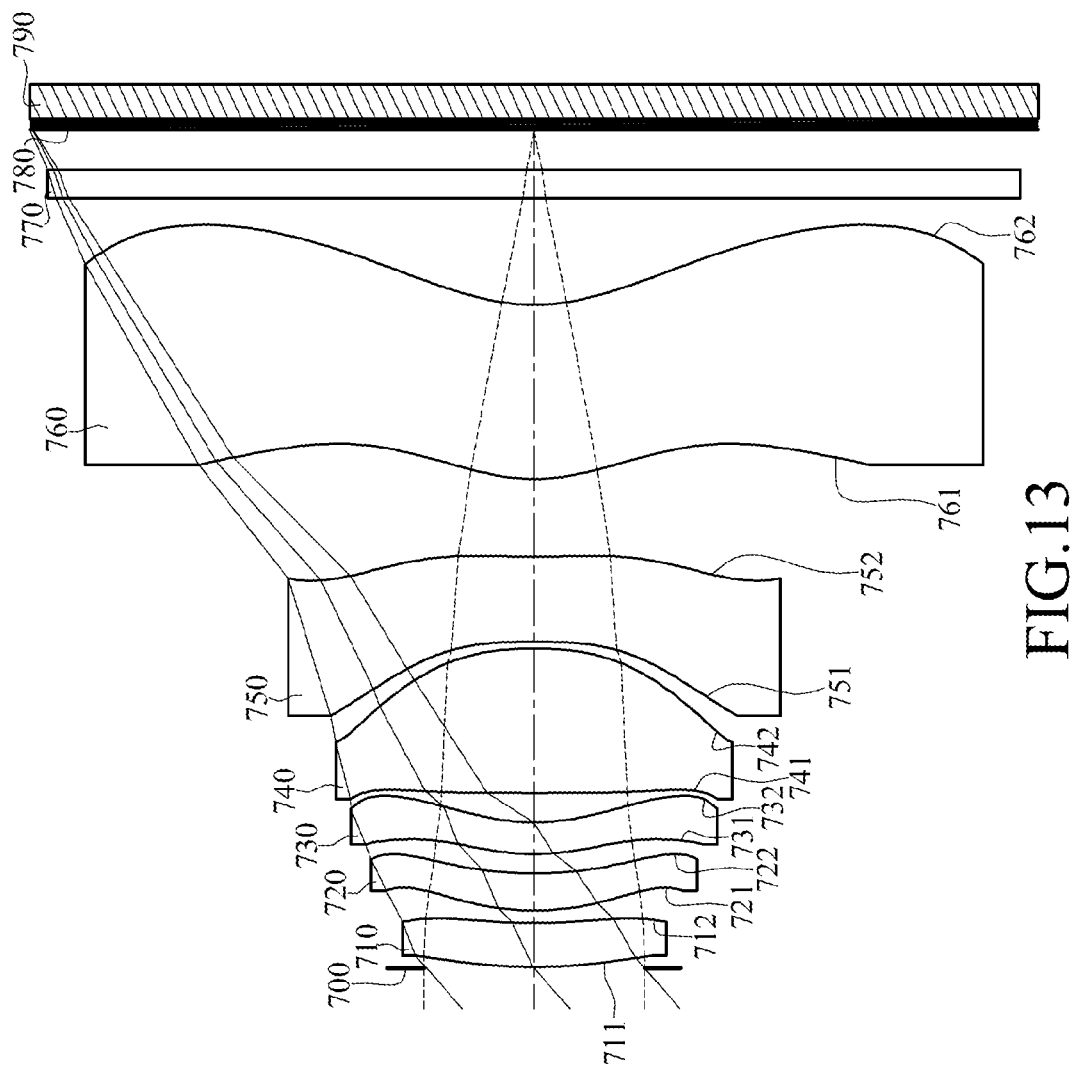
FIG. 13 is a schematic view of an image capturing unit according to the 7th embodiment of the present disclosure.
Figure 14:
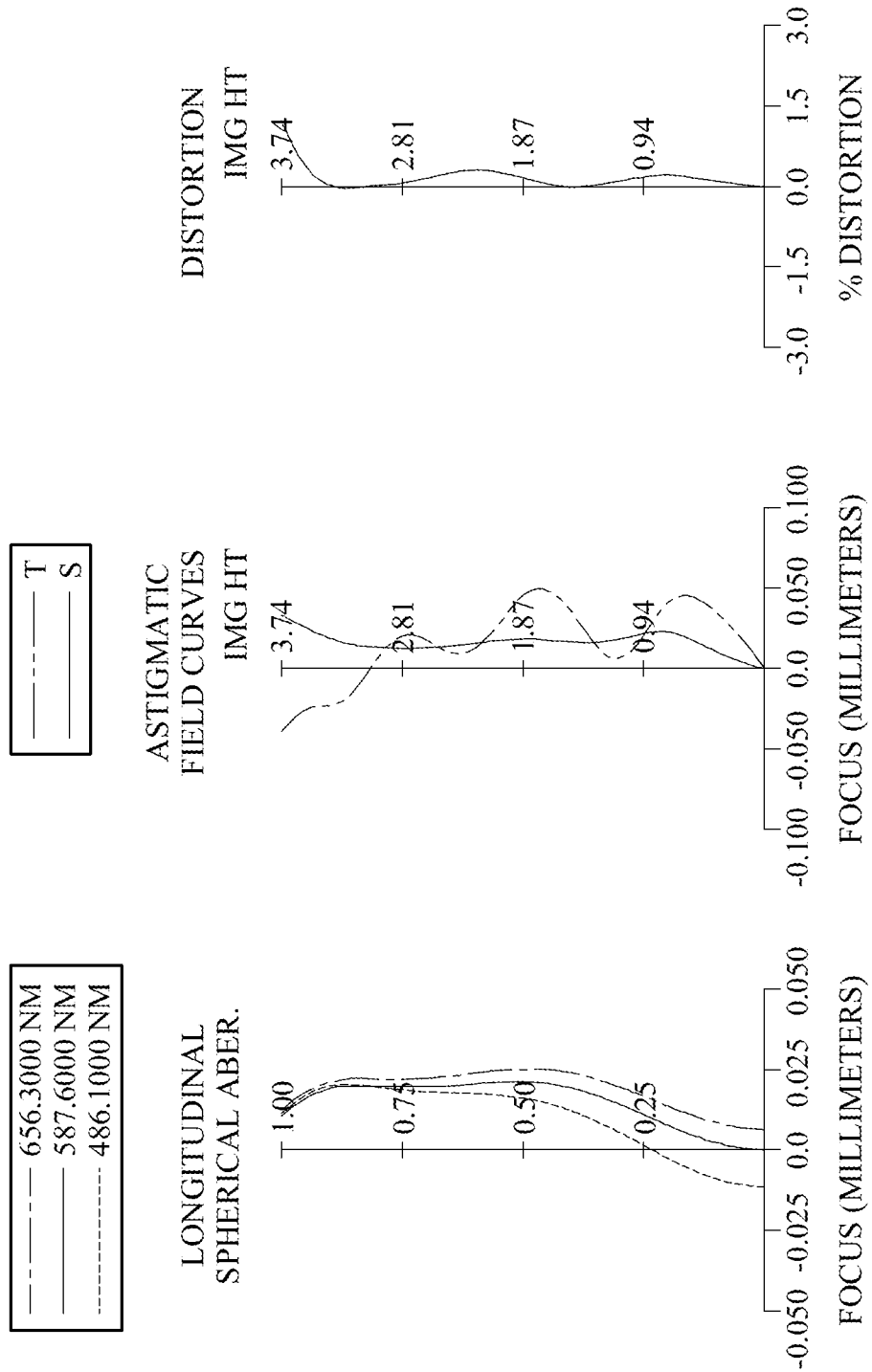
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 790. The photographing optical lens assembly includes, in order from an object side to an image side, an aperture stop 700, a first lens element 710, a second lens element 720, a third lens element 730, a fourth lens element 740, a fifth lens element 750, a sixth lens element 760, an IR-cut filter 770 and an image plane 780, wherein the photographing optical lens assembly has a total of six lens elements (710-760) with refractive power. There is an air gap in a paraxial region is between any two of the first lens element 710, the second lens element 720, the third lens element 730, the fourth lens element 740, the fifth lens element 750 and the sixth lens element 760 that are adjacent to each other.

The first lens element 710 with positive refractive power has an object-side surface 711 being convex in a paraxial region thereof and an image-side surface 712 being concave in a paraxial region thereof. Both of the object-side surface 711 and the image-side surface 712 of the first lens element 710 have at least one inflection point. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being concave in a paraxial region thereof. The object-side surface 721 of the second lens element 720 has at least one concave shape in an off-axis region thereof. Both of the object-side surface 721 and the image-side surface 722 of the second lens element 720 have at least one inflection point. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. Both of the object-side surface 731 and the image-side surface 732 of the third lens element 730 have at least one inflection point. The third lens element 730 is made of plastic material and has the object-side surface 731 and the image-side surface 732 being both aspheric.

The fourth lens element 740 with positive refractive power has an object-side surface 741 being planar in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric.

The sixth lens element 760 with positive refractive power has an object-side surface 761 being convex in a paraxial region thereof and an image-side surface 762 being concave in a paraxial region thereof. The image-side surface 762 of the sixth lens element 760 has at least one convex shape in an off-axis region thereof. The sixth lens element 760 is made of plastic material and has the object-side surface 761 and the image-side surface 762 being both aspheric.

The IR-cut filter 770 is made of glass and located between the sixth lens element 760 and the image plane 780, and will not affect the focal length of the photographing optical lens assembly. The image sensor 790 is disposed on or near the image plane 780 of the photographing optical lens assembly.

The detailed optical data of the 7th embodiment are shown in Table 13 and the aspheric surface data are shown in Table 14 below.

TABLE 13

7th Embodiment
f = 4.17 mm, Fno = 2.53, HFOV = 41.5 deg.

| surface | | Curvature Radius | | Thickness | Material | Index | Abbe# | Focal Length |
|---|---|---|---|---|---|---|---|---|
| 0 | Object | Plano | | Infinity | | | | |
| 1 | Ape. Stop | Plano | | 0.011 | | | | |
| 2 | Lens 1 | 3.908 | (ASP) | 0.327 | Plastic | 1.544 | 55.9 | 419.76 |
| 3 | | 3.859 | (ASP) | 0.094 | | | | |
| 4 | Lens 2 | 1.860 | (ASP) | 0.277 | Plastic | 1.544 | 55.9 | 9.38 |
| 5 | | 2.774 | (ASP) | 0.145 | | | | |
| 6 | Lens 3 | 1.654 | (ASP) | 0.237 | Plastic | 1.544 | 55.9 | −168.78 |
| 7 | | 1.542 | (ASP) | 0.219 | | | | |
| 8 | Lens 4 | ∞ | (ASP) | 1.081 | Plastic | 1.544 | 55.9 | 5.03 |
| 9 | | −2.736 | (ASP) | 0.050 | | | | |
| 10 | Lens 5 | −8.132 | (ASP) | 0.636 | Plastic | 1.639 | 23.5 | −5.17 |
| 11 | | 5.743 | (ASP) | 0.582 | | | | |
| 12 | Lens 6 | 1.415 | (ASP) | 1.300 | Plastic | 1.535 | 55.7 | 7.44 |
| 13 | | 1.493 | (ASP) | 0.800 | | | | |

TABLE 13-continued

7th Embodiment
f = 4.17 mm, Fno = 2.53, HFOV = 41.5 deg.

| surface | | Curvature Radius | Thickness | Material | Index | Abbe# | Focal Length |
|---|---|---|---|---|---|---|---|
| 14 | IR-cut filter | Plano | 0.210 | Glass | 1.517 | 64.2 | — |
| 15 | | Plano | 0.296 | | | | |
| 16 | Image | Plano | — | | | | |

Note:
Reference wavelength is 587.6 nm (d-line).
Effective radius of surface 12 (the object-side surface of the sixth lens element) is 2.500 mm.

TABLE 14

Aspheric Coefficients

| | Surface # | | | | | |
|---|---|---|---|---|---|---|
| | 2 | 3 | 4 | 5 | 6 | 7 |
| k = | 7.3768E−01 | −1.6243E+01 | −2.5833E+00 | 3.3898E+00 | −2.8205E−01 | −6.0331E+00 |
| A4 = | −2.0453E−02 | −8.4434E−02 | −1.0061E−03 | −4.9914E−02 | −2.6015E−01 | 3.6866E−02 |
| A6 = | 3.5946E−03 | −2.8192E−02 | −2.7441E−02 | 8.8642E−02 | 6.5911E−02 | −1.9942E−01 |
| A8 = | −3.0831E−02 | 8.9352E−03 | −4.4951E−02 | −1.7474E−01 | −1.0055E−01 | 2.0758E−01 |
| A10 = | 3.4859E−02 | 2.5943E−02 | −8.8136E−03 | 3.6395E−02 | 1.2036E−01 | −1.2447E−01 |
| A12 = | −4.0383E−02 | −6.2313E−02 | 1.3863E−02 | 4.6956E−02 | −4.6881E−02 | 4.1671E−02 |
| A14 = | 2.0851E−02 | 3.7330E−02 | −3.3705E−03 | −2.3653E−02 | 3.7284E−03 | −7.2131E−03 |

| | Surface # | | | | | |
|---|---|---|---|---|---|---|
| | 8 | 9 | 10 | 11 | 12 | 13 |
| k = | 0.0000E+00 | 6.5174E−01 | −1.0000E+00 | −4.4780E+01 | −7.6561E−01 | −1.1821E+00 |
| A4 = | 4.0560E−02 | −2.9287E−01 | −4.1904E−01 | −2.7979E−01 | −2.1734E−01 | −1.0157E−01 |
| A6 = | −2.5947E−02 | 4.1164E−01 | 5.5905E−01 | 2.8999E−01 | 8.5505E−02 | 2.9242E−02 |
| A8 = | 4.1616E−02 | −4.5433E−01 | −5.9506E−01 | −2.0777E−01 | −3.0278E−02 | −5.9688E−03 |
| A10 = | −6.3876E−02 | 3.2800E−01 | 4.2916E−01 | 9.9426E−02 | 7.4662E−03 | 7.8787E−04 |
| A12 = | 4.1023E−02 | −1.3618E−01 | −1.8005E−01 | −2.8408E−02 | −1.1326E−03 | −6.3466E−05 |
| A14 = | −1.3193E−02 | 2.8578E−02 | 3.9053E−02 | 4.3736E−03 | 9.3716E−05 | 2.8078E−06 |
| A16 = | 1.5952E−03 | −2.1009E−03 | −3.3323E−03 | −2.7990E−04 | −3.2631E−06 | −5.2149E−08 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.17 | ΣCT/Td | 0.78 |
| Fno | 2.53 | f1/f2 | 44.75 |
| HFOV [deg.] | 41.5 | \|f/f1\| + \|f/f2\| + \|f/f3\| | 0.48 |
| CT1/CT2 | 1.18 | f123/f4 | 1.87 |
| Dr3r6/CT4 | 0.61 | (\|R1\| + \|R2\| + \|R3\| + \|R4\| + \|R5\| + \|R6\|)/f | 3.74 |

8th Embodiment

Figure 15:
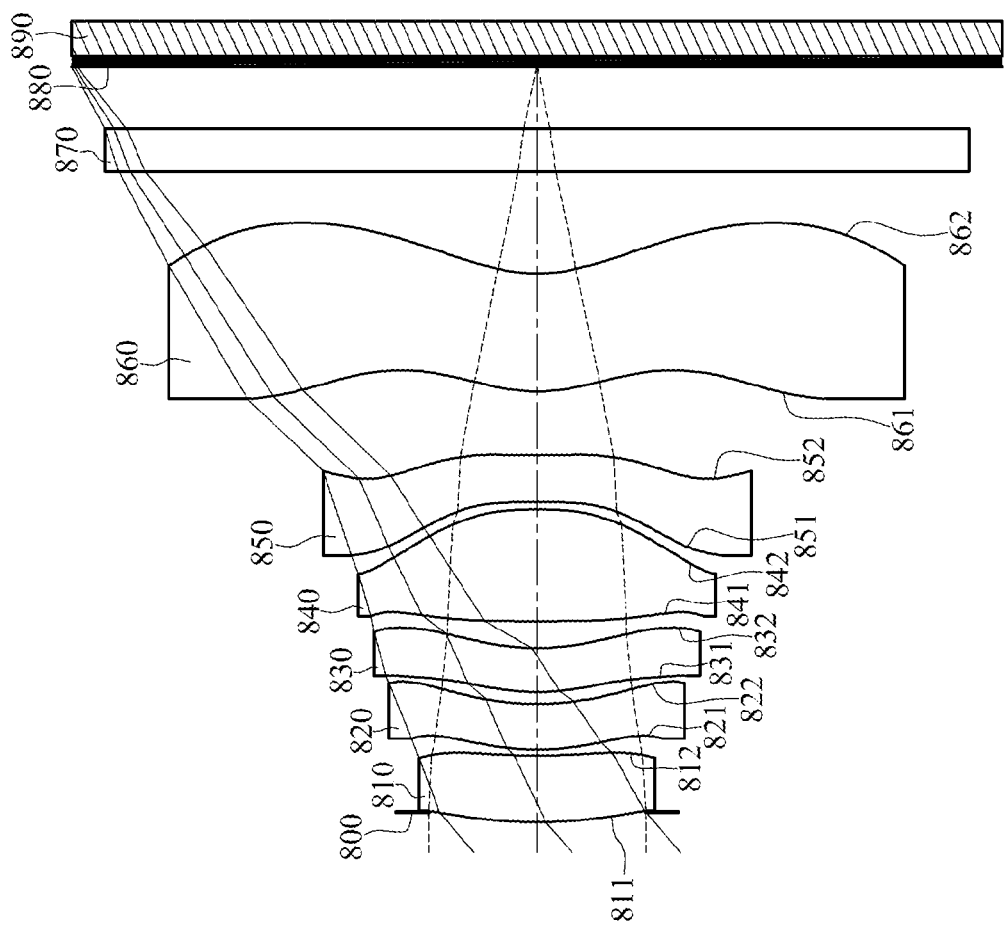
FIG. 15 is a schematic view of an image capturing unit according to the 8th embodiment of the present disclosure.
Figure 16:
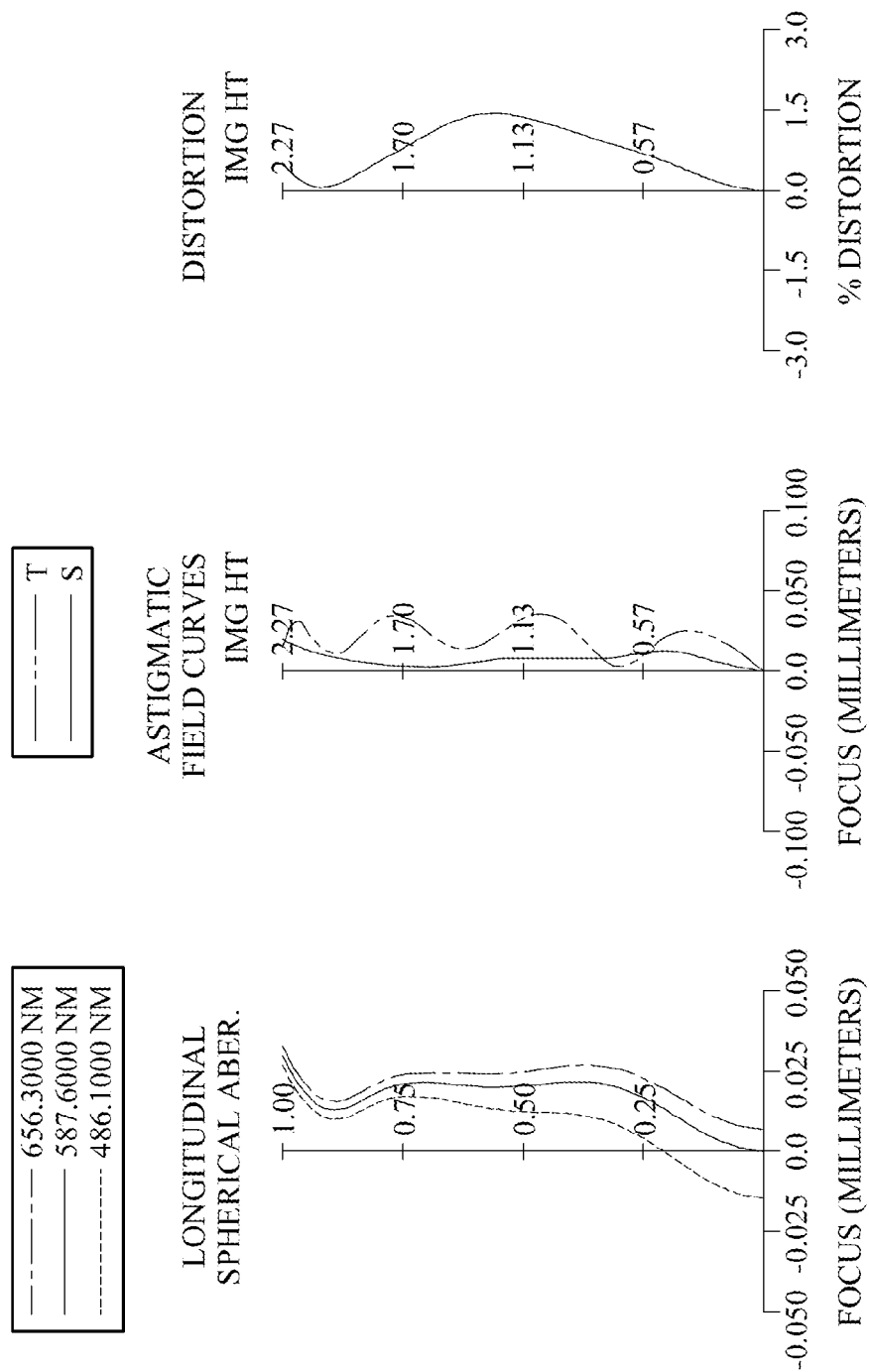
FIG. 16 shows spherical aberration curves, astigmatic field curves and a distortion curve of the image capturing unit according to the 8th embodiment.

FIG. 15 is a schematic view of an image capturing unit according to the 7th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical lens assembly (its reference numeral is omitted) of the present disclosure and an image sensor 890. The photographing optical lens assembly includes, in order from an object side to an image side, an aperture stop 800, a first lens element 810, a second lens element 820, a third lens element 830, a fourth lens element 840, a fifth lens element 850, a sixth lens element 860, an IR-cut filter 870 and an image plane 880, wherein the photographing optical lens assembly has a total of six lens elements (810-860) with refractive power. There is an air gap in a paraxial region is between any two of the first lens element 810, the second lens element 820, the third lens element 830, the fourth lens element 840, the fifth lens element 850 and the sixth lens element 860 that are adjacent to each other.

The first lens element 810 with positive refractive power has an object-side surface 811 being convex in a paraxial region thereof and an image-side surface 812 being concave in a paraxial region thereof. Both of the object-side surface 811 and the image-side surface 812 of the first lens element 810 have at least one inflection point. The first lens element 810 is made of glass material and has the object-side surface 811 and the image-side surface 812 being both aspheric.

The second lens element 820 with positive refractive power has an object-side surface 821 being convex in a paraxial region thereof and an image-side surface 822 being concave in a paraxial region thereof. The object-side surface 821 of the second lens element 820 has at least one concave shape in an off-axis region thereof. Both of the object-side surface 821 and the image-side surface 822 of the second lens element 820 have at least one inflection point. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being concave in a paraxial region thereof. Both of the object-side surface 831 and the image-side surface 832 of the third lens element 830 have at least one inflection point. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric.

The sixth lens element 860 with positive refractive power has an object-side surface 861 being convex in a paraxial region thereof and an image-side surface 862 being concave in a paraxial region thereof. The image-side surface 862 of the sixth lens element 860 has at least one convex shape in an off-axis region thereof. The sixth lens element 860 is made of plastic material and has the object-side surface 861 and the image-side surface 862 being both aspheric.

The IR-cut filter 870 is made of glass and located between the sixth lens element 860 and the image plane 880, and will not affect the focal length of the photographing optical lens assembly. The image sensor 890 is disposed on or near the image plane 880 of the photographing optical lens assembly.

The detailed optical data of the 8th embodiment are shown in Table 15 and the aspheric surface data are shown in Table 16 below.

TABLE 15

8th Embodiment
f = 2.60 mm, Fno = 2.45, HFOV = 40.7 deg.

| surface | | Curvature Radius | | Thickness | Material | Index | Abbe# | Focal Length |
|---|---|---|---|---|---|---|---|---|
| 0 | Object | Plano | | Infinity | | | | |
| 1 | Ape. Stop | Plano | | −0.050 | | | | |
| 2 | Lens 1 | 2.278 | (ASP) | 0.325 | Glass | 1.542 | 62.9 | 32.43 |
| 3 | | 2.486 | (ASP) | 0.030 | | | | |
| 4 | Lens 2 | 1.226 | (ASP) | 0.224 | Plastic | 1.544 | 55.9 | 18.95 |
| 5 | | 1.301 | (ASP) | 0.059 | | | | |
| 6 | Lens 3 | 1.034 | (ASP) | 0.215 | Plastic | 1.544 | 55.9 | 14.66 |
| 7 | | 1.101 | (ASP) | 0.132 | | | | |
| 8 | Lens 4 | 18.825 | (ASP) | 0.549 | Plastic | 1.544 | 55.9 | 3.49 |
| 9 | | −2.090 | (ASP) | 0.035 | | | | |
| 10 | Lens 5 | 94.262 | (ASP) | 0.230 | Plastic | 1.639 | 23.5 | −4.98 |
| 11 | | 3.073 | (ASP) | 0.313 | | | | |
| 12 | Lens 6 | 0.802 | (ASP) | 0.580 | Plastic | 1.535 | 55.7 | 5.87 |
| 13 | | 0.805 | (ASP) | 0.500 | | | | |
| 14 | IR-cut filter | Plano | | 0.210 | Glass | 1.517 | 64.2 | — |
| 15 | | Plano | | 0.303 | | | | |
| 16 | Image | Plano | | — | | | | |

Note:
Reference wavelength is 587.6 nm (d-line).
Effective radius of surface 12 (the object-side surface of the sixth lens element) is 1.420 mm.

TABLE 16

Aspheric Coefficients

| Surface # | | | | | |
|---|---|---|---|---|---|
| 2 | 3 | 4 | 5 | 6 | 7 |
| k = −9.2125E−02 | −1.5921E+01 | −4.4744E+00 | 1.5429E+00 | −1.4326E−01 | −6.6664E+00 |
| A4 = −8.7015E−02 | −4.0316E−01 | −1.0543E−02 | −4.1258E−01 | −1.1819E+00 | 1.2402E−01 |
| A6 = 2.5970E−01 | −3.2446E+00 | −2.1262E+00 | 1.1636E+00 | 9.9679E−01 | −1.8720E+00 |
| A8 = −2.1691E+00 | 2.9470E+01 | 8.1507E+00 | −5.5785E+00 | −2.8035E+00 | 4.1070E+00 |
| A10 = 6.3076E+00 | −1.5792E+02 | −3.5238E+01 | 3.3037E+00 | 1.0854E+01 | −5.0651E+00 |
| A12 = −7.7919E+00 | 4.8336E+02 | 7.1704E+01 | 1.2058E+01 | −1.3692E+01 | 2.9061E+00 |
| A14 = −2.0531E+00 | −7.8501E+02 | −5.7444E+01 | −1.7393E+01 | 3.7401E+00 | 3.1001E−01 |
| A16 = −2.8270E−10 | 5.2357E+02 | 1.2688E−09 | −2.5120E−03 | 1.2342E−03 | −1.2377E+00 |

| Surface # | | | | | |
|---|---|---|---|---|---|
| 8 | 9 | 10 | 11 | 12 | 13 |
| k = −8.9878E+01 | 3.0568E−01 | −4.9922E+01 | −4.9943E+01 | −7.6485E−01 | −2.0303E+00 |
| A4 = 3.3552E−01 | −2.1326E+00 | −3.3535E+00 | −2.2011E+00 | −1.4381E+00 | −5.3834E−01 |

TABLE 16-continued

| Aspheric Coefficients | | | | | | |
|---|---|---|---|---|---|---|
| A6 = | −7.4483E−01 | 8.5608E+00 | 1.1310E+01 | 7.0466E+00 | 1.6714E+00 | 5.6636E−01 |
| A8 = | 4.4110E+00 | −2.2154E+01 | −2.2974E+01 | −1.4676E+01 | −1.6203E+00 | −4.0734E−01 |
| A10 = | −1.9463E+01 | 4.1437E+01 | 3.1368E+01 | 2.1058E+01 | 1.1364E+00 | 1.8937E−01 |
| A12 = | 4.1539E+01 | −5.2344E+01 | −2.6956E+01 | −1.8113E+01 | −5.0458E−01 | −5.4509E−02 |
| A14 = | −4.4909E+01 | 3.8891E+01 | 1.3555E+01 | 8.2118E+00 | 1.2410E−01 | 8.7792E−03 |
| A16 = | 1.9250E+01 | −1.2328E+01 | −3.2976E+00 | −1.5083E+00 | −1.3007E−02 | −6.0129E−04 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.60 | ΣCT/Td | 0.79 |
| Fno | 2.45 | f1/f2 | 1.71 |
| HFOV [deg.] | 40.7 | \|f/f1\| + \|f/f2\| + \|f/f3\| | 0.39 |
| CT1/CT2 | 1.45 | f123/f4 | 1.93 |
| Dr3r6/CT4 | 0.91 | (\|R1\| + \|R2\| + \|R3\| + \|R4\| + \|R5\| + \|R6\|)/f | 3.63 |

The foregoing image capturing unit is able to be installed in, but not limited to, a mobile device, including a smart phone, a tablet personal computer or a wearable device. According to the present disclosure, the first lens element has positive refractive power. The second lens element has positive refractive power. The third lens element has refractive power. The fourth lens element has positive refractive power. The fifth lens element has negative refractive power. The sixth lens element has refractive power. Both of the absolute value of the focal length of the fourth lens element and the absolute value of the focal length of the fifth lens element are smaller than the absolute value of the focal length of the first lens element through the absolute value of the focal length of the sixth lens element. Since both of the fourth lens element and the fifth lens element have stronger refractive power than the other lens elements, it is favorable for correcting the aberration induced by the first lens element and the second lens element with extremely strong refractive power. Moreover, both of the first lens element and the second lens element have positive refractive power, so that it is favorable for balancing the positive refractive powers to further avoid high photosensitivity and manufacturing problems of the photographing optical lens assembly.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising, in order from an object side to an image side:
a first lens element having positive refractive power;
a second lens element having positive refractive power;
a third lens element;
a fourth lens element having positive refractive power;
a fifth lens element having negative refractive power; and
a sixth lens element having an image-side surface being concave in a paraxial region thereof, wherein the image-side surface of the sixth lens element has at least one convex shape in an off-axis region thereof, and both of an object-side surface and the image-side surface of the sixth lens element are aspheric;
wherein the photographing optical lens assembly has a total of six lens elements, both of an absolute value of a focal length of the fourth lens element and an absolute value of a focal length of the fifth lens element are smaller than an absolute value of a focal length of the first lens element, an absolute value of a focal length of the second lens element, an absolute value of a focal length of the third lens element and an absolute value of a focal length of the sixth lens element, the focal length of the first lens element is f1, the focal length of the second lens element is f2, and the following condition is satisfied:

$$0.80 < f1/f2.$$

2. The photographing optical lens assembly of claim 1, wherein the fifth lens element has an object-side surface being concave in a paraxial region thereof.

3. The photographing optical lens assembly of claim 2, wherein a focal length of the photographing optical lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, and the following condition is satisfied:

$$f/f4 > f/fi \ (i=1,2,3,5 \text{ or } 6).$$

4. The photographing optical lens assembly of claim 3, wherein a central thickness of the first lens element is CT1, a central thickness of the second lens element is CT2, and the following condition is satisfied:

$$1.0 < CT1/CT2 < 1.6.$$

5. The photographing optical lens assembly of claim 3, wherein the second lens element has an object-side surface being convex in a paraxial region thereof, and the object-side surface of the second lens element has at least one concave shape in an off-axis region thereof.

6. The photographing optical lens assembly of claim 3, wherein a sum of central thicknesses of the first lens element through the sixth lens element is ΣCT, an axial distance between an object-side surface of the first lens element and the image-side surface of the sixth lens element is Td, and the following condition is satisfied:

$$0.70 < \Sigma CT/Td < 0.95.$$

7. The photographing optical lens assembly of claim 1, wherein the focal length of the first lens element is f1, the focal length of the second lens element is f2, and the following condition is satisfied:

$$1.20 < f1/f2 < 6.0.$$

8. The photographing optical lens assembly of claim 1, wherein at least one of an object-side surface and an image-side surface of each of the first through the third lens elements has at least one inflection point.

9. The photographing optical lens assembly of claim 1, wherein a focal length of the photographing optical lens assembly is f, the focal length of the first lens element is f1, the focal length of the second lens element is f2, the focal length of the third lens element is f3, and the following condition is satisfied:

$$|f/f1|+|f/f2|+|f/f3|<0.80.$$

10. The photographing optical lens assembly of claim 1, wherein an axial distance between an object-side surface of the second lens element and an image-side surface of the third lens element is Dr3r6, a central thickness of the fourth lens element is CT4, and the following condition is satisfied:

$$Dr3r6/CT4<1.0.$$

11. The photographing optical lens assembly of claim 1, further comprising a stop disposed between an object and the first lens element, wherein there is an air gap in a paraxial region between any two of the first lens element, the second lens element, the third lens element, the fourth lens element, the fifth lens element and the sixth lens element that are adjacent to each other.

12. The photographing optical lens assembly of claim 11, wherein a focal length of the photographing optical lens assembly is f, a curvature radius of an object-side surface of the first lens element is R1, a curvature radius of an image-side surface of the first lens element is R2, a curvature radius of an object-side surface of the second lens element is R3, a curvature radius of an image-side surface of the second lens element is R4, a curvature radius of an object-side surface of the third lens element is R5, a curvature radius of an image-side surface of the third lens element is R6, and the following condition is satisfied:

$$(|R1|+|R2|+|R3|+|R4|+|R5|+|R6|)/f<4.5.$$

13. The photographing optical lens assembly of claim 11, wherein only the fifth lens element has an Abbe number being smaller than 30 among the first lens element, the second lens element, the third lens element, the fourth lens element, the fifth lens element and the sixth lens element.

14. The photographing optical lens assembly of claim 11, wherein a composite focal length of the first lens element, the second lens element and the third lens element is f123, the focal length of the fourth lens element is f4, and the following condition is satisfied:

$$1.2 < f123/f4 < 3.0.$$

15. An image capturing unit, comprising:
the photographing optical lens assembly of claim 1; and
an image sensor, wherein the image sensor is disposed on the image side of the photographing optical lens assembly.

16. A mobile device, comprising:
the image capturing unit of claim 15.

17. A photographing optical lens assembly comprising, in order from an object side to an image side:
a first lens element having positive refractive power;
a second lens element with positive refractive power having an object-side surface being convex in a paraxial region thereof;
a third lens element;
a fourth lens element having positive refractive power;
a fifth lens element having negative refractive power; and
a sixth lens element having an image-side surface being concave in a paraxial region thereof, wherein the image-side surface of the sixth lens element has at least one convex shape in an off-axis region thereof, and both of an object-side surface and the image-side surface of the sixth lens element are aspheric;
wherein the photographing optical lens assembly has a total of six lens elements, and both of an absolute value of a focal length of the fourth lens element and an absolute value of a focal length of the fifth lens element are smaller than an absolute value of a focal length of the first lens element, an absolute value of a focal length of the second lens element, an absolute value of a focal length of the third lens element and an absolute value of a focal length of the sixth lens element.

18. The photographing optical lens assembly of claim 17, wherein the third lens element has an image-side surface being concave in a paraxial region thereof.

19. The photographing optical lens assembly of claim 17, further comprising a stop disposed between an object and the first lens element, wherein there is an air gap in a paraxial region between any two of the first lens element, the second lens element, the third lens element, the fourth lens element, the fifth lens element and the sixth lens element that are adjacent to each other.

20. The photographing optical lens assembly of claim 19, wherein a focal length of the photographing optical lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, and the following condition is satisfied:

$$f/f5 < f/fi \ (i=1,2,3,4 \text{ or } 6).$$

21. The photographing optical lens assembly of claim 19, wherein a sum of central thicknesses of the first lens element through the sixth lens element is ΣCT, an axial distance between an object-side surface of the first lens element and an image-side surface of the sixth lens element is Td, and the following condition is satisfied:

$$0.70 < \Sigma CT/Td < 0.95.$$

22. The photographing optical lens assembly of claim 17, wherein the focal length of the first lens element is f1, the focal length of the second lens element is f2, and the following condition is satisfied:

$$1.20 < f1/f2 < 6.0.$$

23. The photographing optical lens assembly of claim 17, wherein a focal length of the photographing optical lens assembly is f, a curvature radius of an object-side surface of the first lens element is R1, a curvature radius of an image-side surface of the first lens element is R2, a curvature radius of the object-side surface of the second lens element is R3, a curvature radius of an image-side surface of the second lens element is R4, a curvature radius of an object-side surface of the third lens element is R5, a curvature radius of an image-side surface of the third lens element is R6, and the following condition is satisfied:

$$(|R1|+|R2|+|R3|+|R4|+|R5|+|R6|)/f < 4.5.$$

24. The photographing optical lens assembly of claim 17, wherein at least one of the object-side surface and an image-side surface of each of the first through the third lens elements has at least one inflection point.

25. An image capturing unit, comprising:
   the photographing optical lens assembly of claim 17; and
   an image sensor, wherein the image sensor is disposed on the image side of the photographing optical lens assembly.

26. A mobile device, comprising:
   the image capturing unit of claim 25.

* * * * *